(12) United States Patent
Ito et al.

(10) Patent No.: US 7,973,852 B2
(45) Date of Patent: Jul. 5, 2011

(54) AUTO-FOCUS APPARATUS, IMAGE CAPTURE APPARATUS, AND AUTO-FOCUS METHOD

(75) Inventors: Yujiro Ito, Kanagawa (JP); Hidekazu Suto, Tokyo (JP)

(73) Assignee: Sony Corporation, Tokyo (JP)

( * ) Notice: Subject to any disclaimer, the term of this patent is extended or adjusted under 35 U.S.C. 154(b) by 1040 days.

(21) Appl. No.: 11/824,521

(22) Filed: Jun. 29, 2007

(65) Prior Publication Data

US 2008/0012977 A1 Jan. 17, 2008

(30) Foreign Application Priority Data

Jun. 30, 2006 (JP) ................................ P2006-182568

(51) Int. Cl.
*H04N 5/232* (2006.01)
*G03B 13/00* (2006.01)
*G03B 3/00* (2006.01)

(52) U.S. Cl. .................... 348/349; 348/345; 396/125

(58) Field of Classification Search .......... 348/345–349; 396/72, 79, 90, 125, 135
See application file for complete search history.

(56) References Cited

U.S. PATENT DOCUMENTS

| | | | |
|---|---|---|---|
| 7,536,095 B2 * | 5/2009 | Suto et al. .................... | 396/90 |
| 7,536,096 B2 * | 5/2009 | Ito et al. ...................... | 396/90 |
| 7,546,030 B2 * | 6/2009 | Ito et al. ...................... | 396/79 |
| 7,593,053 B2 * | 9/2009 | Ito et al. ...................... | 348/348 |
| 2001/0028402 A1 * | 10/2001 | Sugimoto et al. ............. | 348/345 |
| 2004/0174456 A1 * | 9/2004 | Kobayashi et al. ........... | 348/348 |

FOREIGN PATENT DOCUMENTS

| | | |
|---|---|---|
| JP | 55 108635 | 8/1980 |
| JP | 63 203065 | 8/1988 |
| JP | 10 213736 | 8/1998 |
| JP | 2000 47094 | 2/2000 |
| JP | 2000 193879 | 7/2000 |
| JP | 2000 344397 | 12/2000 |
| JP | 2002 27382 | 1/2002 |
| JP | 2004 128731 | 4/2004 |
| JP | 2005 351690 | 12/2005 |
| JP | 2006 148300 | 6/2006 |

* cited by examiner

*Primary Examiner* — Kelly L Jerabek
(74) *Attorney, Agent, or Firm* — Frommer Lawrence & Haug LLP; William S. Frommer

(57) ABSTRACT

Disclosed is an auto-focus apparatus including an evaluation value calculator periodically calculating evaluation values using high frequency components of image signals in a specific region of a subject image. The auto-focus apparatus further includes a control unit for outputting instruction values provided to a lens driver based on the evaluation values, conducting operation to search the peak of the evaluation values while moving positions of the focus lens, returning the lens to the position corresponding to the point at which the relative maximum has been detected after having detected the relative maximum of the evaluation values, obtaining the evaluation values calculated by the evaluation value calculator, and determining whether or not the evaluation value satisfies a prescribed condition; and a storage for storing determination results. In the auto-focus apparatus, the control unit determines whether or not the auto-focus apparatus includes abnormal portions based on the determination results.

14 Claims, 13 Drawing Sheets

AUTO-FOCUS APPARATUS, IMAGE CAPTURE APPARATUS, AND AUTO-FOCUS METHOD

CROSS REFERENCES TO RELATED APPLICATIONS

The present invention contains subject matter related to Japanese Patent Application JP 2006-182568 filed in the Japanese Patent Office on Jun. 30, 2006, the entire contents of which being incorporated herein by reference.

BACKGROUND OF THE INVENTION

1. Field of the Invention

The present invention relates to an auto-focus apparatus, image capture apparatus, and auto-focus method for automatically adjusting focus on a subject using evaluation values generated by image data processing, so that the subject image is in focal status (hereinafter called "in-focus").

2. Description of the Related Art

Typical image capture apparatus, such as video cameras or digital still cameras, includes an auto-focus or AF (automatically adjusting focus) unit for automatically adjusting focus to a subject. Japanese Unexamined Patent Application Publication No. 10-213736, for example, discloses examples of various technologies to improve an accuracy of auto-focus mechanism.

An outline of the typical focus control apparatus for video cameras according to the related art will be described below. FIG. 1 illustrates a configuration of a typical video camera according to the related art. The video camera shown in FIG. 1 performs auto-focus operation using evaluation values generated by image processing. A lens block of the video camera includes a lens group having an image capture lens 101c and a focus lens 101; a position detector 101a; a lens mechanism 10b; and a lens driver 102. The camera block further includes an image-capture device 103, an image-capture device driver 104, an image signal generator 105, an image signal processor 106, an evaluation value calculator 107, a control unit 109, a memory 110, and a switch 113.

A subject image to which focus has been adjusted by moving the focus lens 101 is formed on the image-capture device 103 such as CCD (Charge Coupled Devices) in this video camera. The subject image is then photo-electrically converted into electric signals by the image-capture device 103, and output the signals to the image signal generator 105. The focus lens 101 receives instructions from the lens driver 102 and is moved by the lens drive mechanism 101b. The lens driver 102 includes a lens CPU and a lens drive circuit and outputs instructions for moving the focus lens 101 and adjusting focus (focal point) based on the instructions from the control unit 109. Positions of the focus lens 101a or focus positions are detected by the position detector 101a.

The image-capture device driver 104 drives the image-capture device 103 to photo-electrically convert the subject image formed on the image-capture device 103 and generate photo-electrically converted electric signals. The image signal generator 105 performs appropriate signal processing on electric signals output from the image-capture device 103 and generates image signals complied with a prescribed standard. The image signals are transmitted to a circuit group (image signal processor 106) while input to the evaluation value calculator 107. The evaluation value calculator 107 filters high frequency components of the image signals in a specific region defined within an imaging frame to calculate evaluation values relative to image contrast. When capturing an image of a typical subject, an evaluation value increases as the image approximates in-focus state, and the evaluation value is the relative maximum when the image is in-focus. The aforementioned evaluation value is updated once for one field of image signals.

The control unit 109 includes a CPU (Central Processing Unit), and the like, receives evaluation values calculated by the evaluation value calculator 107 once for one field and operates to search the peak of evaluation values.

A memory 110 includes a semiconductor memory, such as a RAM, and stores focus positions of the lens 101 and information such as evaluation values.

The switch 113 indicates one-shot switch to direct activation of auto-focus operation.

In the configuration of the aforementioned video camera, the control unit 109 moves the focus lens using the evaluation values obtained by image processing, and controls the evaluation values to reach the relative maximum (in-focus state); that is, the control unit 109 operates to search the peak of the evaluation values in order to acquire the relative maximum of the evaluation values. Accordingly, the peak of the evaluation values may be detected regardless of a high-contrast or low contrast subject image.

SUMMARY OF THE INVENTION

When determining whether a subject image is in-focus or out-of-focus using evaluation values, probability of obtaining an accurate focus state may decrease if the focus lens drive mechanism 101b includes defects due to aging, or an SNR (signal-to-noise ratio) of image signals input to the evaluation calculator 107 decreases.

Malfunctions in auto-focus operation due to defects of the focus lens drive mechanism will be described by referring to FIGS. 2A, 2B. FIGS. 2A, 2B are graphs respectively illustrating fluctuations of evaluation values and movement of the focus lens when the focus lens drive mechanism includes some defects such as failure in the focus lens drive mechanism and performance degradation. The vertical axes of the graphs 2A, 2B respectively indicate the evaluation values and movement of the focus lens, and the horizontal axes of the two indicate time. The curves shown on the graphs are plotted once for one field of the image signals or a plurality of data obtained on an irregular base. FIG. 2B shows that focusing is performed at an ultrahigh velocity in the time interval between t0 to t1, at a high velocity in the time interval between t1 to t2, and at a low velocity in the time interval between t2 to t3, and between t3 to t4 of the evaluation peak search operation.

FIGS. 2A, 2B illustrate a case where the control unit 9 fails to return the focus lens to the position corresponding to the point at which the relative maximum has been detected, although the control unit 9 instructs the lens driver 102 to return the focus lens to the focus position corresponding to the point at which the relative maximum has been detected (t2) after having detected (t3) the relative maximum of the evaluation values. In FIG. 2B, a broken line represents the instructed movement of the focus lens directed by the control unit after the relative maximum of the evaluation values has been detected, whereas a solid line represents the actual movement of the focus lens; thereby demonstrating that the movement of the focus lens does not follow the instructions provided by the control unit 109.

In such a case, a user may be informed by displaying warning signs indicating that failure has occurred in the focus lens mechanism. If the failure of this kind frequently or constantly occurs, the user normally notices the failure occurred in the auto-focus apparatus or video camera by the warning signs, and hence may prepare some kind of repair to amend the failure.

If, on the other hand, the failure occurs not so frequently, a user normally fails to notice the failure, and hence leaves the auto-focus apparatus unrepaired. As a result, the aforementioned failure may occur when the actual imaging is in progress.

Malfunctions in auto-focus operation due to a decrease in the SNR of image signals will be described by referring to FIGS. 3A, 3B and FIGS. 4A, 4B. FIGS. 3A, 3B are graphs illustrating fluctuations of evaluation values due to presence or absence of a decrease in SNR. In respective FIGS. 3A, 3B, the horizontal axes indicate movement of the focus lens and the vertical axes indicate the evaluation values. FIGS. 4A, 4B are graphs respectively illustrating fluctuations of evaluation values and movement of the focus lens when the SNR (signal-to-noise ratio) of image signals decreases. The vertical axes of the graphs 4A, 4B respectively indicate the evaluation values and movement of the focus lens, and the horizontal axes of the two indicate time.

In general, when the SNR of image signals decreases, magnitudes and fluctuation of the evaluation values generally increase at the focus lens position corresponding to the point at which the captured subject image is blurred. Referred to FIGS. 3A and 3B, the evaluation value curve 122 including a decrease in SNR shows that the evaluation value and the amount of fluctuation 123 (noise) obtained both significantly increase at the position away from the focus position (in-focus position) at which the relative maximum of the evaluation values is detected; that is, at this focus position, the subject image is blurred, as compared to the evaluation value curve 121 without a decrease in SNR. The evaluation values are obtained by filtering the contrast of the image signals (high frequency components), and hence high frequency components increase according to an increase in the noise.

FIGS. 4A, 4B show a case where that due to a decrease in SNR of the image signals, the relative maximum is erroneously detected at the position away from the focus position (in-focus position) at which the relative maximum of the evaluation values has been detected while searching the peak of the evaluation values. In this case, although the focus lens is returned to the focus position at which the relative maximum of the evaluation values has been detected (t2), the returned position does not correspond to a position where a subject image is in-focus, and hence the evaluation value obtained after returning the focus lens to the focus position is smaller than the above relative maximum of the evaluation values. The relative maximum generated in this case is due to noise in the image signals. Such incorrect detection may result from various causes such as the deterioration of a signal amplifier.

If the SNR of the evaluation signals is large enough for a user to notice image degradation caused by the SNR while imaging a subject, the user may ask a mechanic to have the focus mechanism repaired. However, if the SNR is not large enough for a user to notice, the user normally fails to notice the failure, and hence leaves the operation of auto-focus with some failure, causes of which cannot be detected. Thus, the operation of the auto-focus may be adversely affected if image quality (SNR) deteriorates in this manner.

According to an embodiment of the present invention, when an auto-focus apparatus performs auto-focus operation using evaluation values obtained from image signals of a subject image, the auto-focus apparatus periodically calculates evaluation values using high frequency components of image signals in a specific region of the subject image captured by an image capture unit, and searches the peak of the evaluation values while moving positions of the focus lens. After having detected the relative maximum of the evaluation values, the auto-focus apparatus calculates evaluation values by returning the focus lens to the position corresponding to the point at which the relative maximum has been detected, determines whether or not the evaluation value satisfies a prescribed condition, and then determines whether or not the auto-focus apparatus includes abnormal portions based on the plurality of the determination results.

When some abnormality is detected in the auto-focus operation such as deterioration in performance of auto-focus operation or deterioration in image quality, the result of the focal determination may fluctuate. In the aforementioned method, the fluctuating factors may be used to determine whether or not the auto-focus apparatus exhibits abnormal operation, using evaluation values. The control unit 9 analyzes a relation between evaluation values at the relative maximum and evaluation values when the focus lens returns to the focus position corresponding to the point at which the peak of the evaluation values has been detected, and assesses reliability of the subject image being in-focus. Accordingly, the reliability of the subject image being in-focus is assessed using the fluctuation of evaluation values generated due to movement of the focus lens, thereby improving an accuracy in determining whether or not the auto-focus operation include an abnormal operation.

According to an embodiment of the present invention, when an auto-focus apparatus performs auto-focus operation using evaluation values obtained from image signals of a subject image, the auto-focus apparatus periodically calculates evaluation values using high frequency components of image signals in a specific region of the subject image captured by an image capture unit, calculates luminance addition values by integrating luminance of the image signals in a specific region, and searches the peak of the evaluation values while moving positions of a focus lens. Subsequently, after having detected the relative maximum of the evaluation values, the auto-focus apparatus calculates evaluation values by returning the focus lens to the position corresponding to the point at which the relative maximum has been detected, determines whether or not the evaluation value and luminance addition values satisfy a prescribed condition, and then determines whether or not the auto-focus apparatus includes abnormal portions based on the plurality of the determination results.

When some abnormality is detected in the auto-focus operation such as deterioration in performance of auto-focus operation or deterioration in image quality, the result of the focal determination may fluctuate. In the aforementioned method, the fluctuating factors may be used to determine whether or not the auto-focus apparatus exhibits abnormal operation, using evaluation values. Since an auto-focus apparatus analyzes a relation between evaluation values obtained at the relative maximum and evaluation values obtained when the focus lens is returned to the focus position corresponding to the point at which the peak of the evaluation values have been detected, and assesses reliability of the subject image being in-focus, the reliability can be assessed without being affected by fluctuation of the evaluation values caused by movement of the focus lens. Further, the reliability of the subject image being in-focus may be assessed with the more specific manner by setting a plurality of thresholds.

According to an embodiment of the present invention, a prescribed assessment or determination may be performed using evaluation values obtained by image processing, based on which whether or not the auto-focus apparatus includes an abnormal operations. Accordingly, the current auto-focus operation state may be assessed although the apparatus has only a simple configuration. Moreover, since the auto-focus apparatus is configured such that a user can be informed (warned) of deterioration in performance of auto-focus operation, deterioration in image quality, or the like, the user may recognize abnormal auto-focus operation, and hence may prepare some kind of repairing in order to amend the failure of the video camera.

DESCRIPTION OF THE PREFERRED EMBODIMENTS

Preferred embodiments of the present invention will be described in detail in accordance with accompanied drawings.

Figure 1:
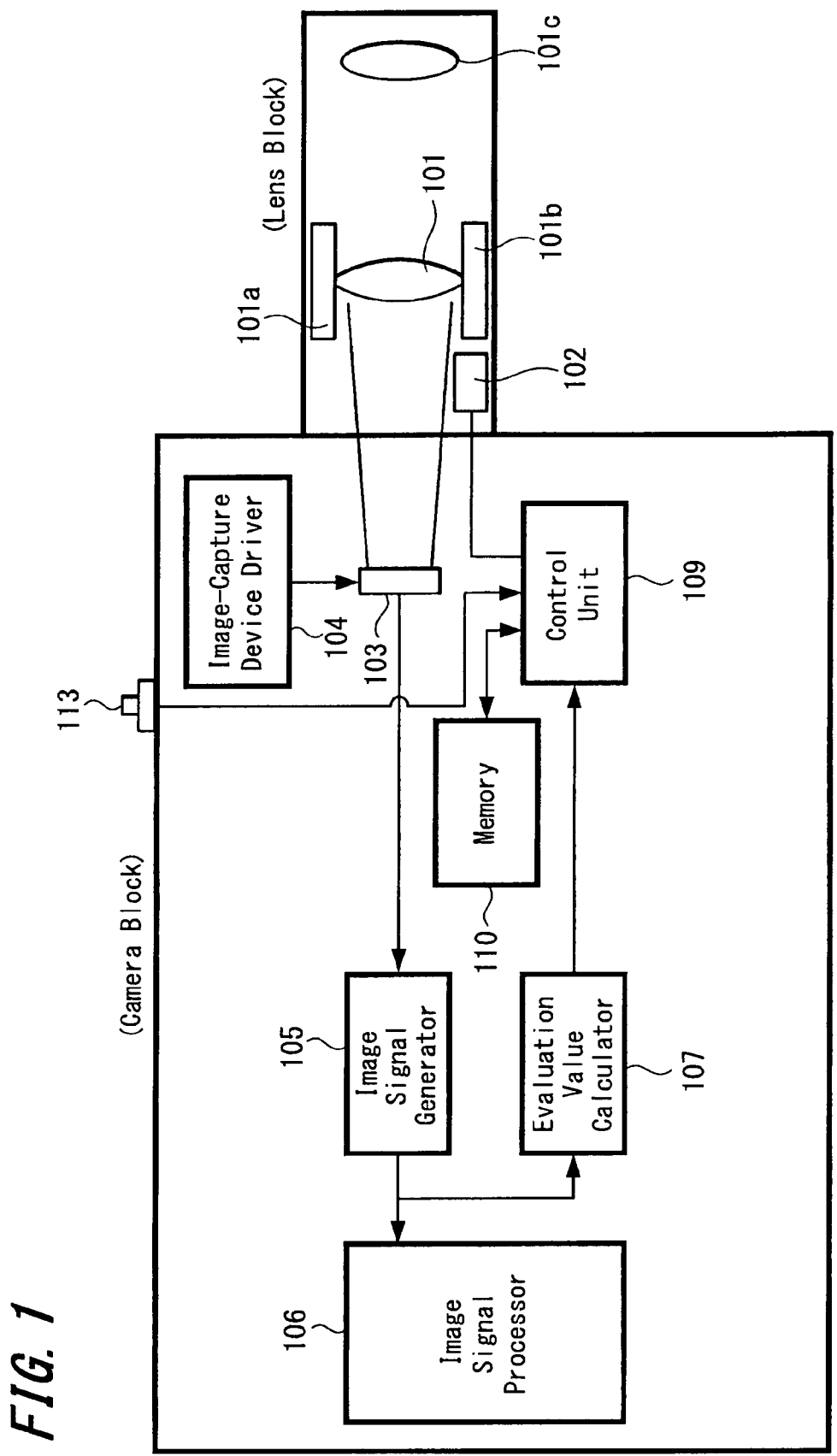
FIG. 1 is a diagram illustrating a configuration of a video camera according to the related art.
Figure 5:
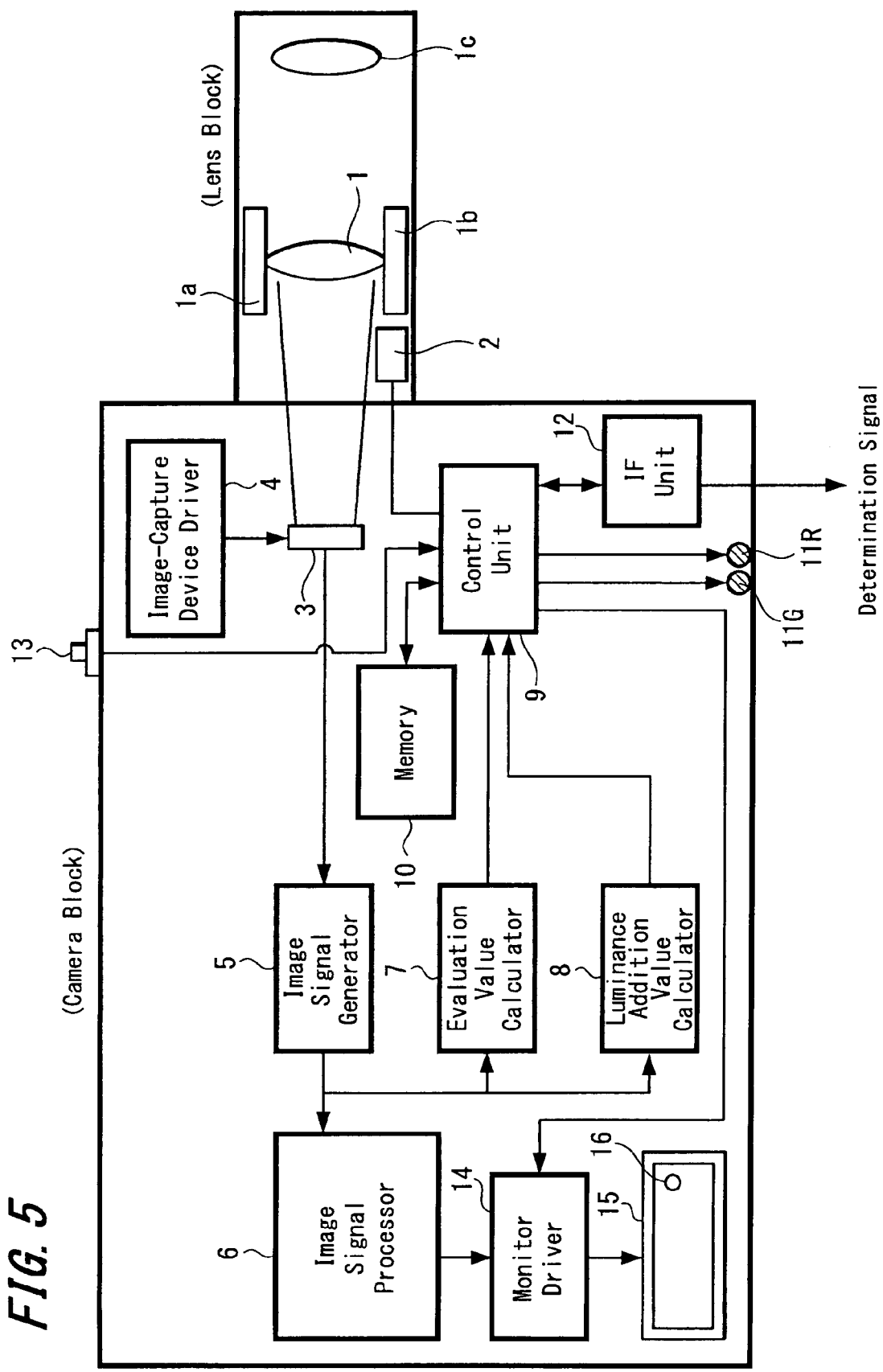
FIG. 5 is a diagram illustrating a configuration of a video camera according to a first embodiment of the present invention.

FIG. 5 illustrates a configuration of an image capture apparatus, such as a video camera, including an auto-focus mechanism according to a first embodiment of the present invention. The video camera shown in FIG. 5 includes a luminance addition value calculator configured to generate luminance addition values obtained by integrating luminance in a specific region (central portion) of imaged signals, Interface (IF) unit, and a monitor, in addition to the configuration shown in the FIG. 1.

A lens block of the video camera includes a lens group that has a focus lens 1 configured to focus a subject image incident on an image-capture lens 1c on an image-capture surface of the image-capture device, a position detector configured to detect positions of each lens, a lens drive mechanism configured to drive each lens, and a lens driver configured to control movement of the lens drive mechanism. Lenses such as a wobbling lens used to determine the directions of focal position other than the focus lens 1 and the image-capture lens 1c are omitted from the lens block shown in FIG. 5.

The focus lens 1 includes the position detector 1a configured to detect positions of the focus lens 1 or focus positions, the lens drive mechanism 1b configured to move the positions of the focus lens in the direction of an optical axis, and the lens driver 2 configured to move the lens drive mechanism. Likewise, a wobbling lens (not shown) includes a wobbling lens driving mechanism configured to move a position detector and lens position in the direction of an optical axis in order to perform appropriate wobbling. The lens block includes an aperture stop (not shown) configured to limit an amount of light that can pass through; and the aperture stop includes an aperture stop position detector configured to detect the aperture size of the aperture stop and an aperture stop drive mechanism configured to open and close the aperture stop.

The lens driver 2 is supplied with respective detected signals from the position detector 1a including: a signal to indicate focus positions, a signal to indicate an amount of wobbling, and a signal to indicate the aperture size of the aperture stop. The lens driver 2 including a lens CPU and a lens drive circuit is configured to move a focus (focal point) of the focus lens 1 according to instructions transmitted from the control unit 9. The lens driver 2 is connected with a user interface (not shown) configured to set modes of auto-focus or initiate the auto-focus operation, so that the lens driver 2 is supplied with operation signals according to operation of the user interface. The lens driver 2 includes a storage (not shown) having a ROM or EEPROM, on which information is stored, such as focal length data of the focus lens 1 and the wobbling lens, aperture ratio data, the name of manufacturer, and manufacturer's serial numbers.

The lens driver 2 generates lens drive signals based on the stored information, respective detected signals, and focus control signals or wobbling control signals described later supplied from the control unit 9. The lens driver 2 also supplies generated lens drive signals to the lens drive mechanism 1b to move the focus lens 1 to a desired focus position. The lens driver 2 supplies the generated lens drive signals to a wobbling lens drive mechanism to wobble the wobbling lens, so that the focus lens 1 may detect a direction of a focus position. The lens driver 2 further generates aperture stop drive signals to control the aperture size of the aperture stop.

In the video camera shown in FIG. 5, the subject image is formed on the image-capture device 3 via the focus lens 1, is then photo-electrically converted into electric signals by the image-capture device 3 and output to the image signal generator 5. The image-capture device 3 may include a CCD (Charge Coupled Devices), CMOS (Complementary Metal Oxide Semiconductor), and the like. The image-capture device driver 4 is one example of the image-capture device drive circuit that supplies drive signals to the image-capture device 3 for photo-electronically converting the subject image formed on the image-capture device 3 into signals. The drive signals are supplied based on a vertical direction synchronization signal, a horizontal direction synchronization signal, and a clock signal generated from a clock signal generator that all used for a standard operation for each unit of the video camera.

In image signal generator 5, electric signals output from the image-capture device 3 are subject to appropriate signal processing, and image signals complied with a prescribed standard are generated. The image signals are transmitted to a circuit group (image signal processor 6), and are also input to the evaluation value calculator 7. The evaluation value calculator 7 is configured to filter high frequency components of image signals in a specific region provided within a captured image frame, and calculates the evaluation values relative to the image contrast. In imaging a typical subject, the evaluation values generally increases as a subject image approximates in-focus state, and the evaluation value is relative maximum when the subject image is in-focus. The evaluation value is updated once for one field of image signals. Autofocus operation using evaluation values is well-known technology in the art, one example of which is described in detail in Japanese Unexamined Patent Application Publication No. 10-213736 previously disclosed by the applicant of the present invention.

The aforementioned processing is performed for each of three primary colors R (Red), G (Green), and B (Blue). For example, the camera block includes a color separating prism (not shown). The color separating prism separates light incident from the lens block into the three primary colors R, G, and B, and supplies the R component light to R component image-capture device, the G component light to G component light to G component image-capture device, and the B component light to B component image-capture device, respectively. In FIG. 5, the three R, G, and B component image-capture devices are represented as an image-capture device 3.

The subject images for each color formed on the image-capture device 3 are subject to prescribed processing before the subject images are photo-electrically converted into signals by the image-capture device 3 and output to the image signal generator 5. The image signal generator 5, for example, includes a preamplifier (not shown) and an A/D (Analog/Digital) converter. The level of the electric signals input to the image signal generator 5 is amplified by the preamplifier, and correlated double sampling is performed on the signals to eliminate a reset noise, and the A/D converter converts analog signals into digital image signals.

Further, the image signal generator 5 is configured to perform gain control, black level stabilizer, or dynamic range control, and the like of the supplied image signals for each color, and supply the image signals thus obtained to the image signal processor 6, the evaluation value calculator 7, and the luminance addition value calculator 8.

The image signal generator 6 performs various signal processing of the image signals supplied from the image signal generator 5, and generates output image signals. For example, the image signal generator 6 performs knee correction to compress image signals at or above a certain level, gamma correction to set a correct level for image signals according to a configured gamma curve, and white clip processing or black clip processing to limit image signal levels to a prescribed range. The image signal generator 6 also performs edge enhancement processing or linear matrix processing, encode processing, or the like to generate output image signals in a desired format.

The evaluation value calculator 7 filters the high frequency components using image signals in a specific region provided within the captured image frame of the image signals to calculate evaluation values ID corresponding to the image contrast and supply the calculated evaluation values ID to the control unit 9.

The image signal generator 5 having such as a preamplifier and A/D converter, the image signal processor 6, the evaluation value calculator 7, and the like, perform respective processing using the vertical direction synchronization signal VD, the horizontal direction synchronization signal HD, and the clock signal CLK synchronized with the image signals supplied from units, the image signal processor 6, the evaluation value calculator 7. The vertical direction synchronization signal VD, the horizontal direction synchronization signal HD, and the clock signal CLK may alternatively be obtained from the clock signal generator.

Figure 6:
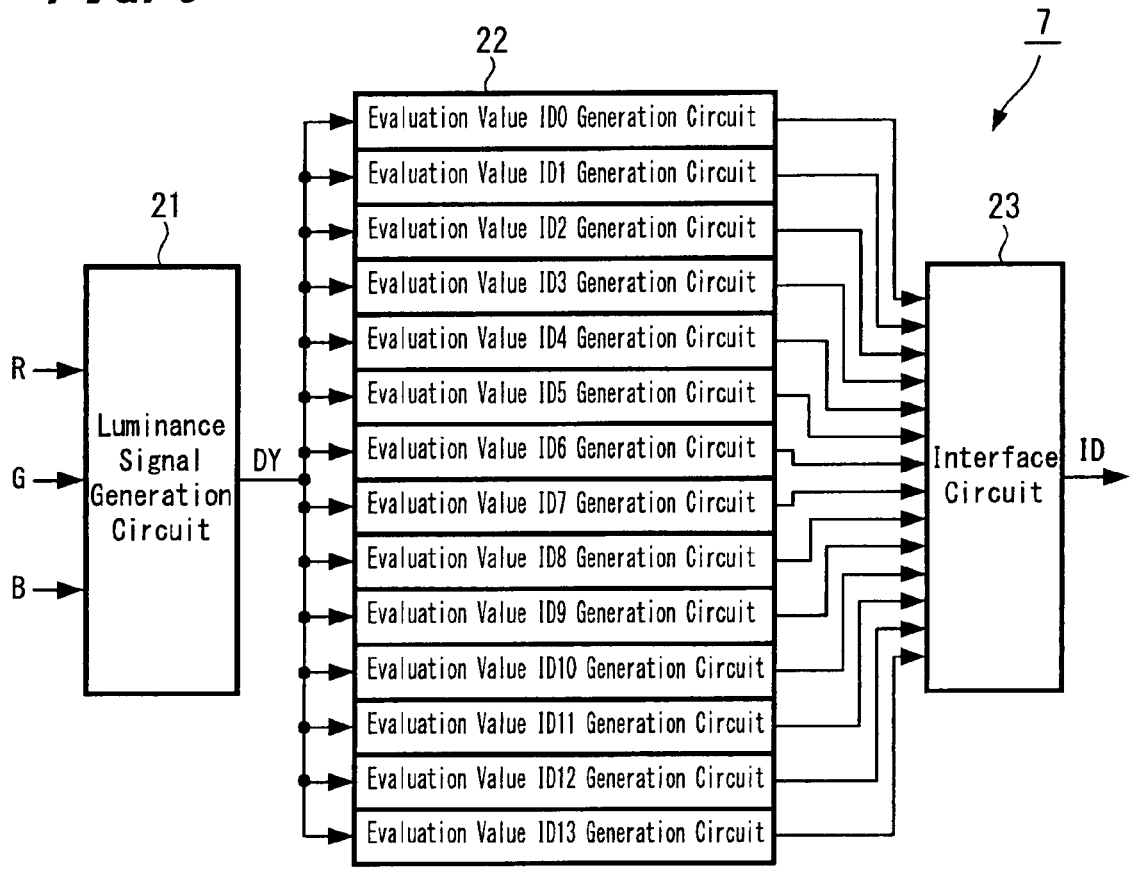
FIG. 6 is a diagram illustrating a configuration of an evaluation value calculator according to an embodiment of the present invention.
Figure 7:
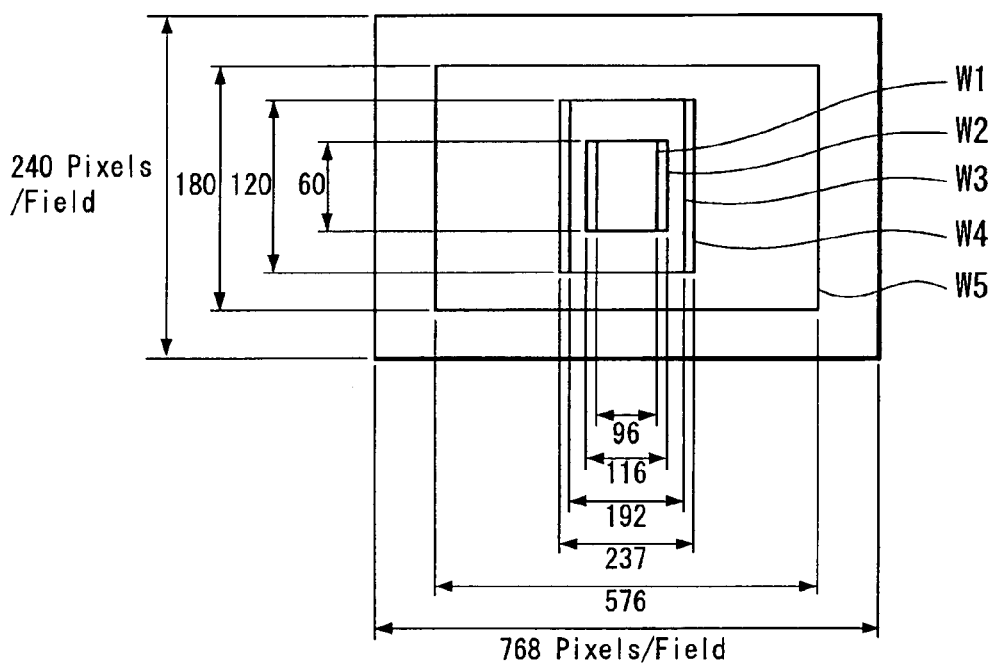
FIG. 7 is a diagram illustrating regions used for evaluating an image for according to an embodiment of the present invention.

The evaluation value calculator 7 is described more in detail below. FIG. 6 illustrates a configuration of the evaluation value calculator 7. The evaluation value calculator 7 includes a luminance signal generation circuit 21 configured to generate a luminance signal DY based on image signals for each color, the evaluation value generation circuit 22 to generate 14 types of evaluation values ID0 to ID13 as described below, and an interface circuit 23. The interface circuit 23 is configured to communicate with the control unit 9 and supply the generated evaluation values according to requests from the control unit 9.

The image signal generator 21 performs the following operation:

DY=0.30R+0.59G+0.11G using the image signals R, G, B supplied from the image signal generator 5 and generate a luminance signal DY. The luminance signal DY is generated in this manner, because it is sufficient to simply detect changes in the level of contrast and determine whether contrast is high or low in order to determine whether a subject image is in-focus or out of focus.

The evaluation value generator 22 generates the evaluation values ID0 to ID13. The evaluation values ID0 to ID13 are obtained by summing the frequency components of image signals in a specific region (hereinafter called "evaluation frame") provided within the captured image frame, and provide values corresponding to the blurring of the image.

Evaluation values ID0: Evaluation value name "IIR1_W1_HPeak"

Evaluation values ID1: Evaluation value name "IIR1_W2_HPeak"

Evaluation values ID2: Evaluation value name "IIR1_W2_HPeak"

Evaluation values ID3: Evaluation value name "IIR4_W3_HPeak"

Evaluation values ID4: Evaluation value name "IIR0_W1_VIntg"

Evaluation values ID5: Evaluation value name "IIR3_W1_VIntg"

Evaluation values ID6: Evaluation value name "IIR1_W1_HIntg"

Evaluation values ID7: Evaluation value name "Y_W1_HIntg"
Evaluation values ID8: Evaluation value name "Y_W1_Satul"
Evaluation values ID9: Evaluation value name "IIR1_W3_HPeak"
Evaluation values ID10: Evaluation value name "IIR1_W4_HPeak"
Evaluation values ID11: Evaluation value name "IIR1_W5_HPeak"
Evaluation values ID12: Evaluation value name "Y_W3_HIntg"
Evaluation values ID13: Evaluation value name "Y_W3_HIntg"

Evaluation value names indicating the attributes (data used_evaluation frame size_evaluation calculation method) are provided with the evaluation values ID0 to ID13.

The data used in the evaluation value names are broadly divided into "IIR" and "Y". "IIR" implies data including high-frequency components obtained from the luminance signal DY using a HPF (high-pass filter); whereas "Y" implies data using original frequency components of the luminance signal DY without using a HPF.

When using a HPF, an IIR type (infinite impulse response type) HPF is used. Evaluation values are divided into IIR0, IIR1, IIR3, and IIR4 according to the type of HPF; these represent HPFs having different respective cutoff frequencies. Thus, by setting HPFs having different cutoff frequencies, for example, by using a HPF having a high cutoff frequency in the vicinity of in-focus position, changes in the evaluation value can be increased compared with the case of using a HPF with a low cutoff frequency. Further, when the captured image is largely out of focus, changes in the evaluation value can be increased using a HPF with a low cutoff frequency compared with the case of using a HPF with a high cutoff frequency. In this manner, HPFs having different cutoff frequencies may be set according to the focusing state during auto-focus operation in order to select the optimal evaluation value.

Figure 4A:
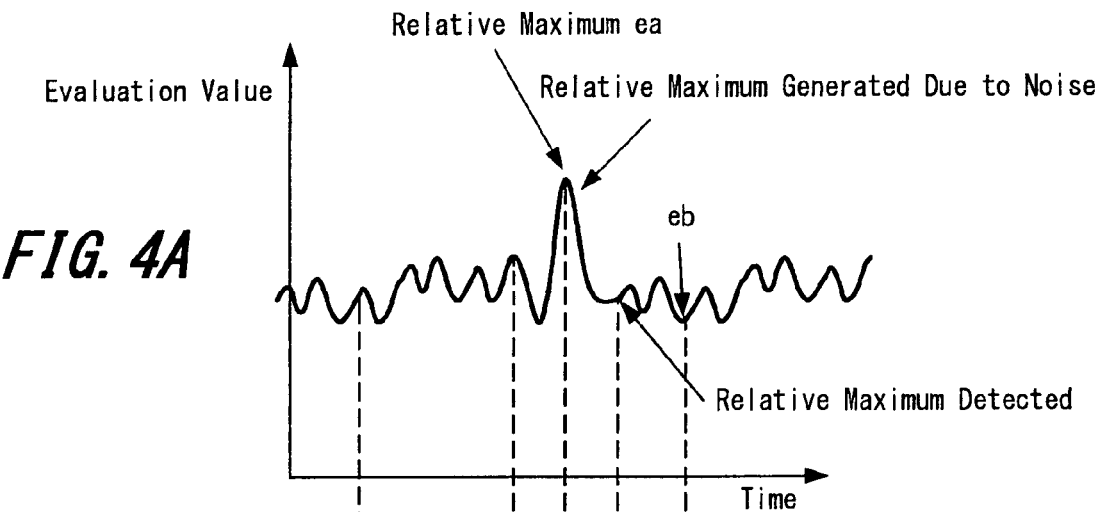
FIGS. 4A, 4B are second graphs respectively illustrating fluctuations of evaluation values and movement of the focus lens when auto-focus processing fails to terminate according to an embodiment of the present invention.
Figure 4B:
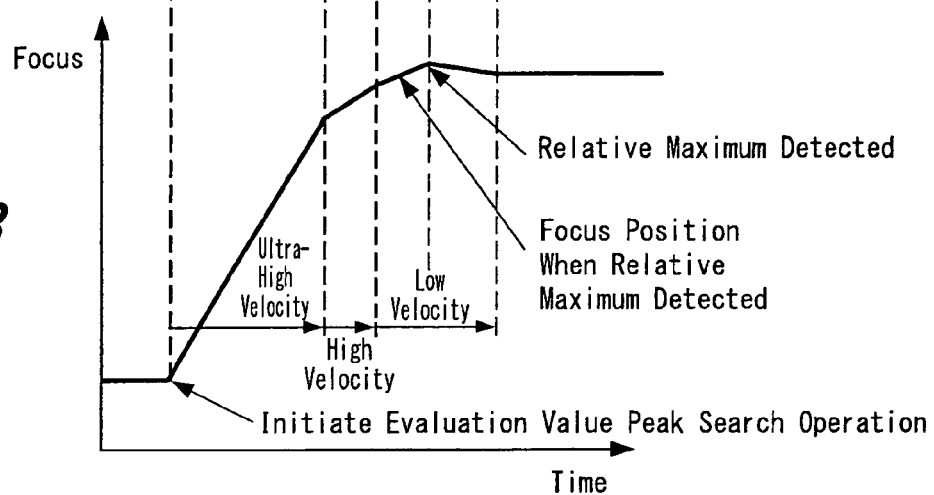

The evaluation frame size implies the size of the image region used in evaluation value generation. As shown in FIG. 4, five types of evaluation frame sizes, W1 to W5, may for example be provided; the center of each evaluation frame corresponds to the center of the captured image. In FIG. 4, the evaluation frame sizes W1 to W5 when the image size for one field is 768 pixels×240 pixels are illustrated.

Evaluation frame size W1: 116 pixels×60 pixels
Evaluation frame size W2: 96 pixels×60 pixels
Evaluation frame size W3: 232 pixels×120 pixels
Evaluation frame size W4: 192 pixels×120 pixels
Evaluation frame size W5: 576 pixels×180 pixels Thus, different evaluation values can be generated corresponding to the frame sizes by setting one of the plurality of frame sizes. Hence, an appropriate evaluation value can be obtained by setting one of the evaluation values ID0 to ID13, regardless of the size of the target subject.

Evaluation value calculation methods include the HPeak, HIntg, VIntg, and Satul methods. The HPeak system implies calculating horizontal evaluation values usby the peak system; the HIntg system includes calculating horizontal evaluation values by the whole integration system; the VIntg system involves calculating vertical-direction evaluation values by the integration system and the Satul system includes the number of saturated luminance.

The HPeak method is an evaluation value calculation method in which a HPF is used to determine high-frequency components from horizontal-direction image signals, and is used to compute the evaluation values ID0, ID1, ID2, ID3, ID9, ID10, and ID11. FIG. 5 shows the configuration of a horizontal-direction evaluation value calculation filter used for the HPeak method. The horizontal-direction evaluation value calculation filter includes a HPF 31 that filters only high-frequency components from the luminance signals DY of the luminance signal generation circuit 21; an absolute value processing circuit 32 that selects the absolute values of the high-frequency components; a multiplication circuit 33 that multiplies the absolute values of the high-frequency components by the horizontal-direction frame control signals WH; a line peak hold circuit 34 that holds one peak value per line; and a vertical-direction integration circuit 35 that integrates the peak values for all the lines in the evaluation frame in the vertical direction.

The high-frequency components of the luminance signals DY are filtered by the HPF 31, and absolute values selected by the absolute value processing circuit 32. Subsequently, the horizontal-direction frame control signals WH are multiplied by the multiplication circuit 33 to obtain absolute values of high-frequency components within the evaluation frame. That is, if frame control signals WH the multiplication value of which is "0" outside the evaluation frame are supplied to the multiplication circuit 33, then only the absolute values of horizontal-direction high-frequency components within the evaluation frame are supplied to the line peak hold circuit 34. Here, the frame control signals WH in the vertical direction form a square wave; however, the frame control signals WH in the horizontal direction do not merely include characteristics of a mere square wave but include characteristics of a triangular wave, so that the multiplied value of the frame control signals WH is reduced in the periphery of the frame (both ends). Thus, as the subject image within the frame approximates in-focus state, it is possible to reduce effects caused by the subject image interfering the external edges around the periphery of the frame (high luminance edges in the evaluation frame, including noise, drastic change, or the like of the evaluation values) or variability in the evaluation values caused by movement of the subject can be decreased. The line peak hold circuit 34 holds the peak values for each line. The vertical-direction integration circuit 35 adds peak values held for each line within the evaluation frame in the vertical direction, based on vertical-direction frame control signals WV, thereby obtaining the evaluation value. This method is called the HPeak method, because horizontal-direction (H) peaks are held temporarily.

Figure 8:
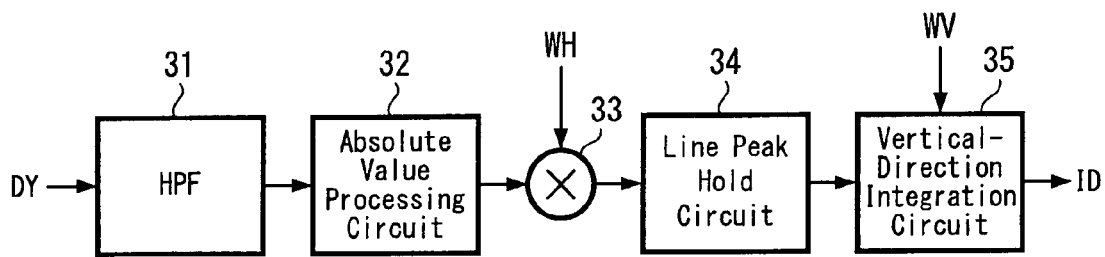
FIG. 8 is a diagram illustrating a configuration of a horizontal-direction evaluation value calculation filter according to an embodiment of the present invention.
Figure 9:
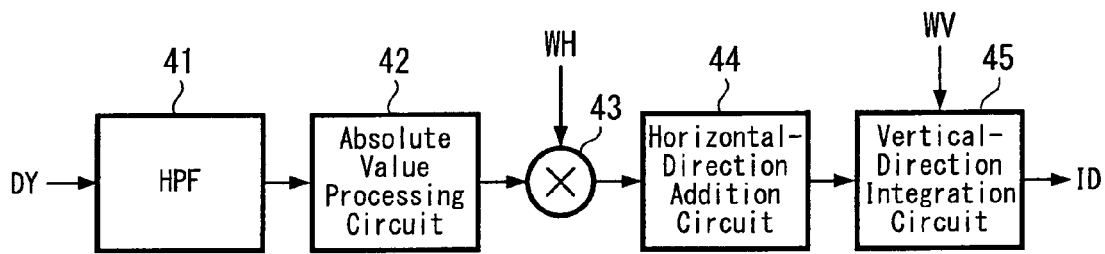
FIG. 9 is a diagram illustrating a configuration of a horizontal-direction evaluation value calculation filter with a whole integration system according to an embodiment of the present invention.

The HIntg method is defined as a total-integration type horizontal-direction evaluation value calculation method. FIG. 9 illustrates a configuration of a total-integration type horizontal-direction evaluation value calculation filter. This total-integration horizontal-direction evaluation value calculation filter is used in figuring out the evaluation values ID6, ID7, ID12, and ID13. Compared with the HPeak method horizontal-direction evaluation frame control signals WH calculation filter of FIG. 8, the HIntg method filter is configured to include a HPF 41, an absolute value processing circuit 42, and a multiplication circuit 43 the three units of which are similar to those from 31 to 33 in FIG. 5; but differs in that, in the horizontal-direction addition circuit 44 the absolute values of horizontal-direction high-frequency components in the evaluation frame are all added, and then, in the vertical-direction integration circuit 45, the addition results for all lines in the vertical direction in the evaluation frame are integrated in the vertical direction. Moreover, there is a difference between the HPeak method and the HIntg method in the following point; whereas in the HPeak method one peak value is determined per line, and the obtained peak values are added in the vertical direction, in the HIntg method the absolute values of horizontal-direction high-frequency components for each line are all added, and then the obtained high-frequency components are added in the vertical direction.

The HIntg method is divided into IIR1 and Y. The IIR1 employs high-frequency components as the data, whereas the Y employs original luminance signals DY. Luminance addition values are obtained by a luminance addition value calculation filter circuit, resulting by removing the HPF 31 from the total-integration type horizontal-direction evaluation value calculation filter of FIG. 9.

The VIntg method is a total-integration type vertical-direction evaluation value calculation method, used for obtaining the evaluation values ID4 and ID5. In both the HPeak method and the HIntg method, values are added in the horizontal direction to generate evaluation values; however, in the VIntg method, high-frequency components are added in the vertical direction to generate the evaluation values. For example, in a case of an image the upper half of which is white while the lower half is black, such as an image with a horizon or other scenes, so that there are only high-frequency components in the vertical direction but are no high-frequency components in the horizontal direction, the HPeak method horizontal-direction evaluation value does not function effectively. Hence the evaluation value in VIntg method is used in order that AF functions effectively for such scenes.

Figure 10:
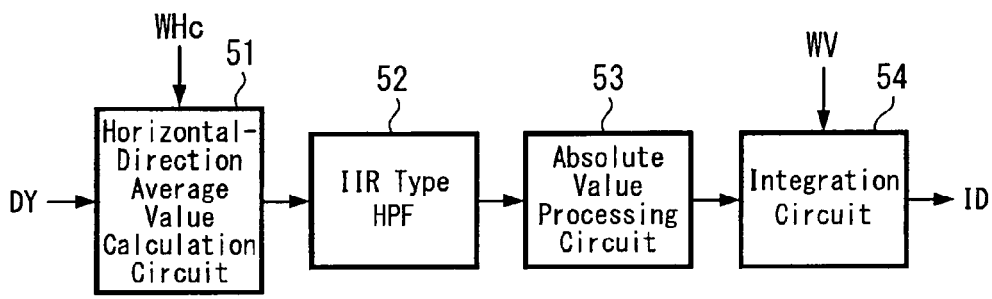
FIG. 10 is a diagram illustrating a configuration of a vertical-direction evaluation value calculation filter according to an embodiment of the present invention.

FIG. 10 illustrates a configuration of a vertical-direction evaluation value calculation filter that calculates vertical-direction evaluation values. The vertical-direction evaluation value calculation filter has a horizontal-direction average value calculation filter 51, an IIR-type HPF 52, an absolute value processing circuit 53, and an integration circuit 54. The horizontal-direction average value calculation filter 51 selects luminance signals of pixels (e.g., 64 pixels) in the center portion of the evaluation frame in the horizontal direction from the luminance signals DY for each line, based on a frame control signals WHc, computes the average value (or the total value) using the selected luminance signals. The horizontal-direction average value calculation filter 51 then outputs one result for one horizontal period. Here, the 64 pixels of the center portion are specified to be used to remove noise in the evaluation frame peripheral portion. In the vertical-direction evaluation value calculation filter, the luminance signals per 64 pixels are sequentially accumulated, and finally one average value of the luminance signals per 64 pixels is output, so that the vertical-direction evaluation value calculation filter may not need include a line memory, frame memory, or other memory device, resulting in a simple configuration. Subsequently, this horizontal-direction average value is synchronized with the line frequency and high-frequency components are filtered by the HPF 52, and the absolute value processing circuit 53 is used to convert the filtered high-frequency components into the absolute values of the high-frequency components. Further, the integration circuit 54 integrates over all lines within the evaluation frame in the vertical direction based on the vertical-direction frame control signal WV.

The Satul method is a calculation method in which the number of luminance signals DY that are saturated; that is, a luminance level equal to or above a prescribed level, within an evaluation frame is determined, and the outcome is used in calculating the evaluation values ID8. In calculating the evaluation values ID8, the luminance level of the luminance signal DY is compared with a threshold α, and the number of pixels for which the luminance level of the luminance signal DY is equal to or above the threshold α in the evaluation frame is counted for each field, and the outcome is determined as the evaluation values ID8.

The configuration of the video camera is described by referring back to FIG. 6. The luminance value calculator 8 is a circuit configured to integrate the luminance of image signals in a specific region (central portion) obtained by the image-capture device and generate the luminance addition values. The evaluation value calculator 8 adds the luminance signals in a specific region obtained from image signals for each color input from the image signal generator 5, and the added result is output to the control unit 9 as the luminance addition values.

The control unit 9, for example, includes a CPU (Central Processing Unit), RAM (Random Access Memory), and ROM (Read Only Memory), and retrieves computer programs stored in the ROM onto the RAM to run the programs, and hence a prescribed control and processing such as auto-focus operation are performed. The control unit 9 receives evaluation values calculated by an evaluation value calculator 7 once for one field, and searches the peak of the evaluation values. The auto-focus operation is performed using instructions as a trigger from a one-shot switch 13 that directs activation of the auto-focus operation. The control unit 9 and the lens driver 2 of the lens block are configured such that the control unit 9 and the lens driver 2 may communicate with each other using predetermined formats and protocols, and collaborate to control the auto-focus operation. The lens driver 2 supplies various information such as the focus position or the value indicating the aperture stop size to control unit 9. The lens driver 2 generates lens drive signals based on focus control signals or wobbling control signals supplied from the control unit 9 to perform drive processing on the focus lens 1 and wobbling lens. The control unit 9 generates and supplies the focus control signal for controlling to drive the focus lens 1 or the wobbling control signals for controlling to drive the wobbling lens to the lens driver 2, based on the evaluation values ID calculated by the evaluation calculator and the various information retrieved from the driver 2.

Each of the lens driver 2 and the control unit 9 incorporates a microcomputer and a memory to perform the auto-focus operation by retrieving to run a program stored in the non-volatile memory.

A memory 10 is a storage unit into which data are written and from which data are read out by the control unit 9. The storage unit is configured to store information such as the focus position of the focus lens 1 and the evaluation value calculated at the evaluation value calculator 7. The memory 10 includes a non-volatile memory such as semiconductor memories.

Indicators 11G, 11R are one example of display units; each of which includes a light emitting diode (LED; Light Emitting Diode (green, red) respectively. The indicator 11G or 11R lights up based on the outcome of reliability of the subject image being in-focus is assessed by the control unit 9. It is apparent that neither type nor color used for an indicator may be limited to those described above as the example.

An interface 12 (hereinafter called "IF unit") is one example of a signal output unit. The IF unit 12 outputs signals according to the outcome of assessed reliability of the subject image being in-focus to outside the auto-focus apparatus or video camera. The operation signals input from outside are transmitted from the IF unit 12 to the control unit 9, so that the movement of the video camera is controlled based on the operation signals acquired from the outside.

A liquid crystal monitor driver 14 is configured to generate an image signal output from a signal processor 6 and drive signals for displaying characters, icons, or the like on a monitor 15 directed by the control unit 9. The drive signal is supplied to the monitor 15 based on respective synchronization signals and the clock signal included in the image signals.

The monitor 15 is one example of display units, for which a liquid crystal display device may be used. The monitor 15 receives drive signals supplied from the monitor driver 14 to display images according to supplied signals. The monitor 15 may be a viewfinder for video cameras.

In the video camera according to the configuration, when the focus is converged at the peak of the evaluation values while the video camera operates to search the peak of the evaluation values, the history of the evaluation values is searched and a user is provided with this information. If, for example, the history of the evaluation values satisfies a prescribed condition, a green indicator 11G lights up to indicate that the subject image is in-focus. If, on the other hand, the history of the evaluation values does not satisfy the prescribed condition, a red indicator 11R lights up to indicate that the subject image may be out-of-focus. According to this embodiment, after having converged focus by the auto-focus operation, whether the subject image is in-focus or out-of-focus is determined, and a user is informed of the outcome of determination by lighting up indicators 11G, 11R, displaying the outcome on the monitor 15, and the like.

Alternatively, special icons 16, which are small pictures representing particular computer processing or items, may be provided on a screen of the monitor 15 or a viewfinder for displaying the obtained outcome. The icons may be changed in shape and color according to the outcome for discrimination.

Moreover, the outcome may be divided into three phases or four more phases as follows, which may be shown with three indicators such as green, yellow, and red:
"highly reliable to obtain an accurate in-focus status",
"fairly reliable to obtain an accurate in-focus status", and
"unreliable to obtain an accurate in-focus status".

A method of determining reliability of whether a subject image is in-focus or out-of-focus is described as follows with reference to the following FIG. 11 to FIG. 15.

Figure 11A:
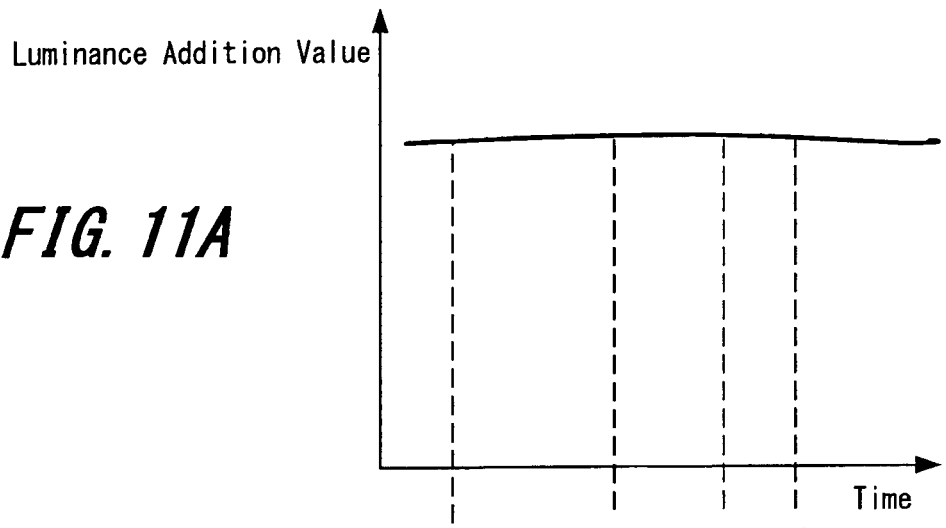
FIGS. 11A, 11B, 11C are graphs respectively illustrating fluctuations of luminance addition values, evaluation values, and movement of the focus lens when auto-focus processing normally or successfully terminates according to an embodiment of the present invention.
Figure 11B:
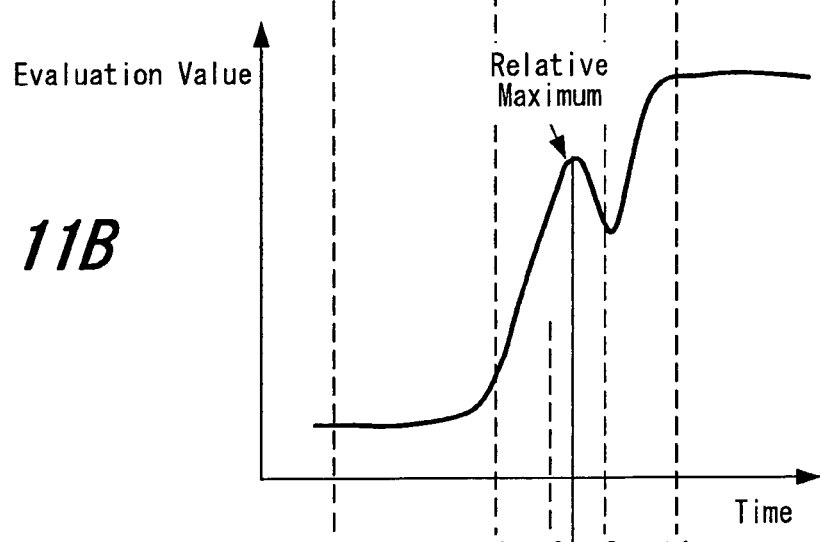
Figure 11C:
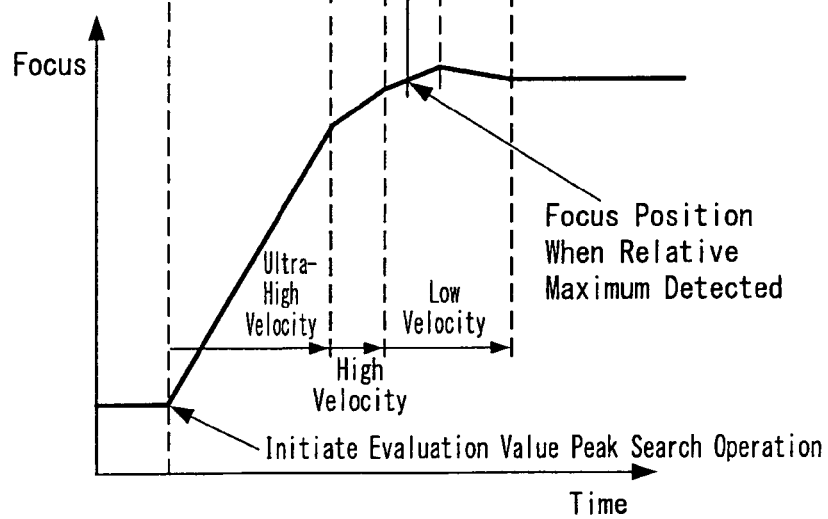

FIGS. 11A, 11B, 11C respectively illustrate fluctuations of luminance addition values, evaluation values, and focus while the focus lens of the video camera searches the position corresponding to a point at which the peak of the evaluation values is detected.

The vertical axes of the graphs in FIGS. 11A, 11B, and 11C respectively indicate the luminance addition values, the evaluation value, and movements of the focus lens, and the horizontal axes of three indicate time.

The curves shown on the graphs are plotted once for one field of the image signals or a plurality of data obtained on an irregular base. FIG. 11C shows that focusing is performed at an ultrahigh velocity in the time interval between t0 to t1, at a high velocity in the time interval between t1 to t2, and at a low velocity in the time interval between t2 to t3, and between t3 to t4 of the evaluation value peak search operation.

In this embodiment, the velocity of focusing varies with the focus position and the evaluation value; however, the velocity of focusing is not limited to this method, and the velocity of focusing may be configured to remain constant regardless of distance.

FIG. 11A shows that the luminance addition values hardly change despite the movement of the focus lens when imaging the subject with almost no wobbling by the video camera in a typical static manner. This results from the fact that the luminous flux that reaches a video camera does not generally fluctuate so much with a change in the state of focus.

By contrast, the evaluation value may change according to change in focus status. FIG. 11C shows the outcome while moving the focus lens between a point representing the initial increase and a point representing the detection of the relative maximum (between t0 and t3). After detecting the relative maximum (t3) using hill-climbing and hill-descending evaluations, the focus lens reverses a focus direction and returns the lens to the position corresponding to the point at which the relative maximum has been detected (t3 to t4).

When the focus lens returns to the position corresponding to the point at which the relative maximum has been detected, the evaluation value obtained is generally larger than the relative maximum as shown in FIG. 11B. In particular, the evaluation values obtained while moving the focus lens are generally smaller than the values obtained when the focus lens returns to and stops at the position corresponding to the point at which the relative maximum has been detected, because a change in the contrast of the subject image is generally small while moving the focus lens. That is, an accurate contrast cannot be obtained, because the focus lens is still moving at the position corresponding to the point at which the relative maximum is detected.

Accordingly, the evaluation value obtained when the focus lens returns to and stops at the position corresponding to the point at which the relative maximum has been detected is generally smaller than the evaluation value obtained while the focus lens is passing the focus position at which the relative maximum is detected.

Figure 12A:
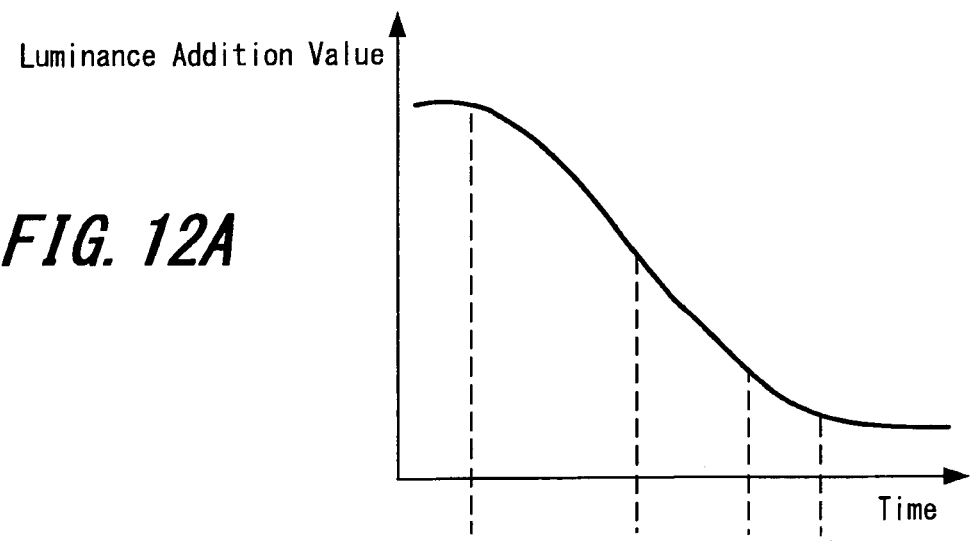
FIGS. 12A, 12B, 12C are graphs respectively illustrating fluctuations of luminance addition values, evaluation values, and movement of the focus lens when auto-focus processing fails to terminate according to an embodiment of the present invention.
Figure 12B:
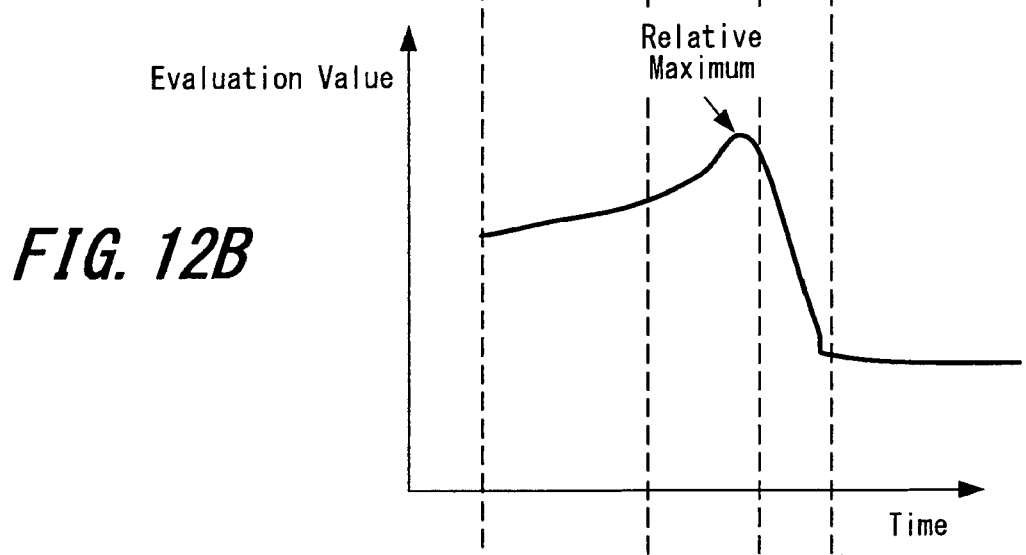
Figure 12C:
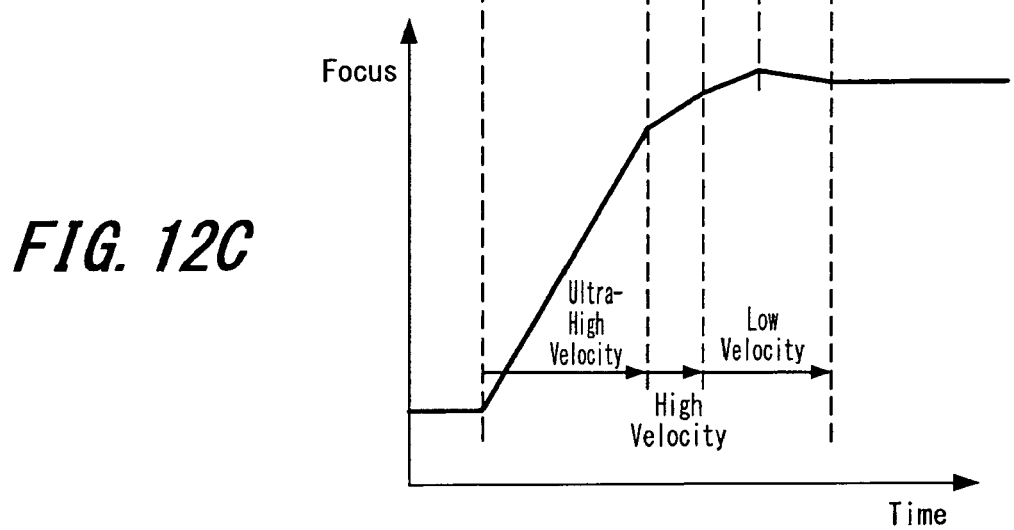

FIGS. 12A 12B, 12C respectively illustrate fluctuations of luminance addition values, evaluation values, and focus while the focus lens of the video camera searches the position corresponding to the peak of the evaluation values at which inaccurate focus may be determined. FIGS. 9A and 9B represent behaviors of the luminance addition values and the evaluation value when capturing an image with wobbling of the subject or wobbling of the video camera. FIG. 12B shows that the evaluation value is small while the subject image is out-of-focus although the focus lens returns to the position corresponding to the point at which the relative maximum has been detected. This results from generation of the inappropriate relative maximum obtained due to a change in the evaluation values while the subject or the video camera wobbles. In addition, the luminance addition values drastically change while the subject or the video camera wobbles as shown in FIG. 12A.

According to the embodiments of the present invention, whether a subject image is in-focus or out-of-focus at the focus position calculated by auto-focus unit is determined with a high reliability by examining the histories of the evaluation values and the luminance addition values as described above.

A first focal determination method is defined as a process in which the memory 10 stores a result determined based on the condition A after each auto-focus processing terminates; that is, after the control unit 9 determines that focus positions have been converged to the point where a subject image is in-focus. The condition A is used to determine whether or not auto-focus operation terminates normally, using the history of the evaluation values.

Condition A

In the condition A, if the relative maximum of evaluation values is defined as ea and the evaluation value obtained when the focus lens returns to and stops at the position corresponding to the point at which the relative maximum has been detected is defined as eb, a value obtained by dividing the evaluation value eb by the relative maximum ea is larger than the prescribed threshold. The condition A is represented by the following equation 1.

$$\alpha \geq eb/ea \qquad 1$$

where α represents a constant.

The aforementioned α is defined based on the results obtained by experiments or tests conducted.

Figure 13:
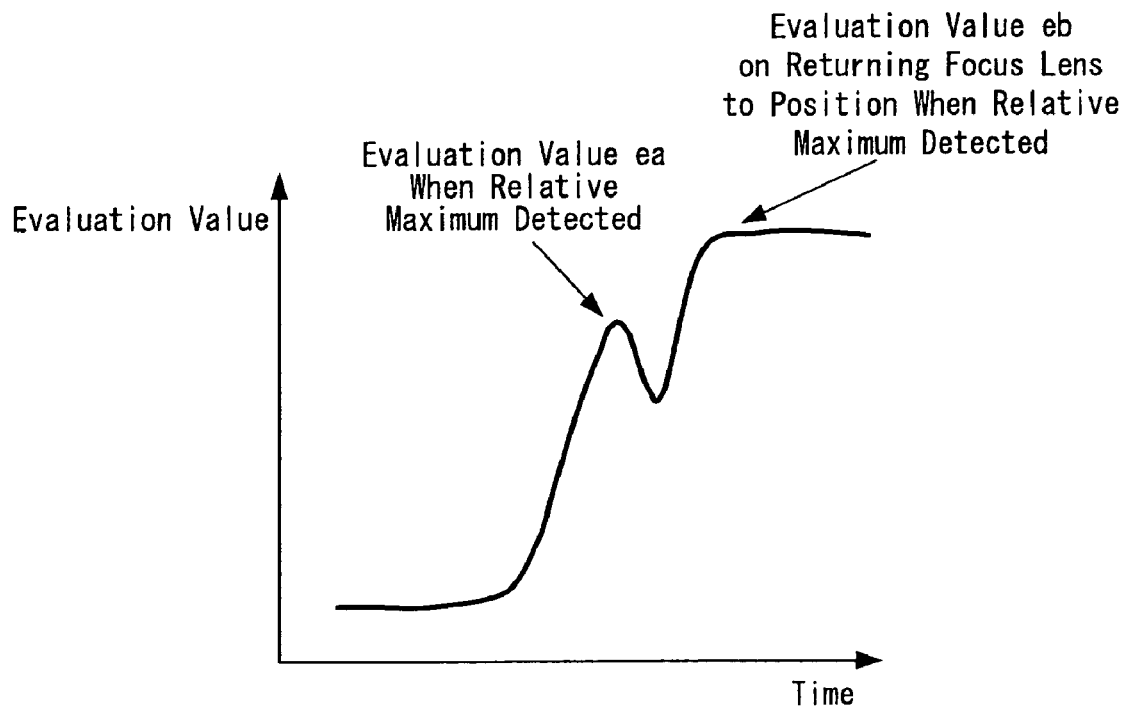
FIG. 13 is a graph illustrating an example of evaluation values with which whether a subject image is in-focus or out-of-focus can be determined according to an embodiment of the present invention.

For example, when the value obtained from dividing the evaluation value eb by the relative maximum ea is larger than the prescribed threshold (equation 1 is satisfied) as shown in FIG. 13 (as in FIG. 11B), the subject image is determined to be in-focus state.

Figure 14:
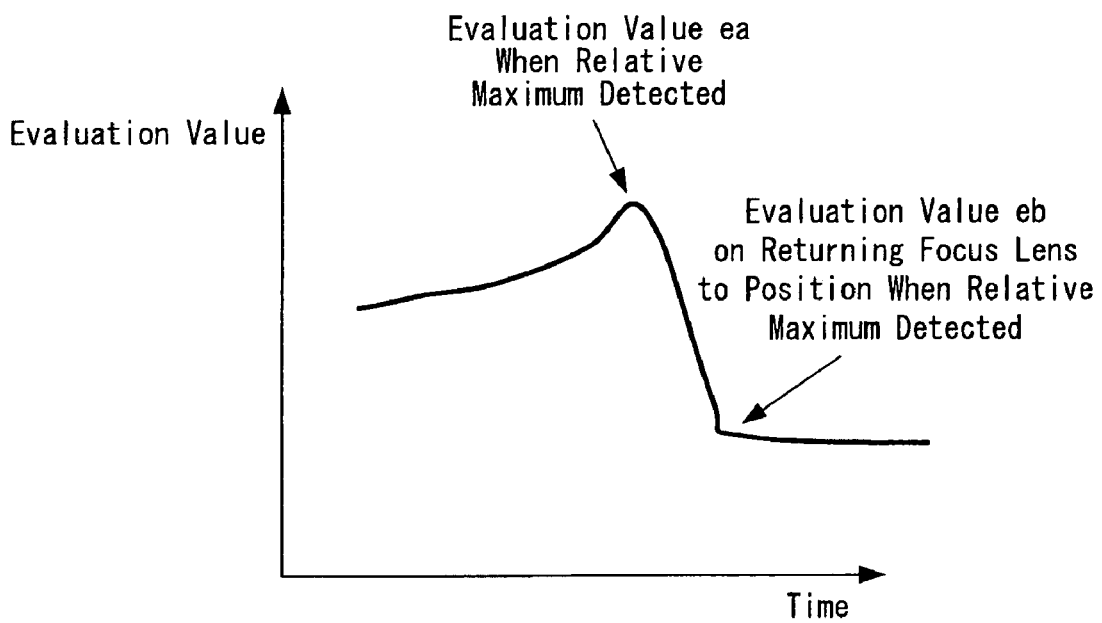
FIG. 14 is a graph illustrating an example of evaluation values with which whether a subject image is in-focus or out-of-focus can be determined according to an embodiment of the present invention.

By contrast, when the value obtained from dividing the evaluation value eb by the relative maximum ea is smaller than the prescribed threshold, which is represented by the following equation α<eb/ea as shown in FIG. 14 (as in FIG. 12B), the subject image is determined to be out-of-focus sate.

A second focal determination method is defined as an integrated determination in which the result determined based on the following condition B is used to determine whether a subject image is in-focus or out-of-focus, in combination to the result determined based on the first focal determination method (condition A). If the first focal determination is performed by computing the equation 1, it is highly probable that the subject image is determined to be out-of-focus, and hence the ratios obtained by the following equation may not be a correct ratio:

number of times that a subject image being in-focus is determined as unreliable/number of times that a subject image being in-focus is determined as reliable In order to eliminate the adverse effect, the second focal determination is performed by computing the equation 2 using the luminance addition values, and the first focal determination (whether or not the result obtained satisfies the equation 1) is only performed if the result obtained satisfies the equation 2. Subsequently, the result obtained by computing the equation 1 and equation 2 is stored the memory 10. In other words, the equation 2 is used to eliminate extraneous factors from the ratio that may affect the result, such as wobbling, and obtain the outcome resulting only from image processing of a video camera apparatus.

Specifically, in the second determination method, the memory 10 stores the result determined by the condition A, if the result satisfies the condition (B) only. The condition B is used to determine whether or not a subject has wobbled. If the condition B is satisfied, the subject image is determined to have not wobbled, and hence the result obtained by having auto focused positions converged to the point without wobbling may be recorded.

Condition B

Figure 15A:
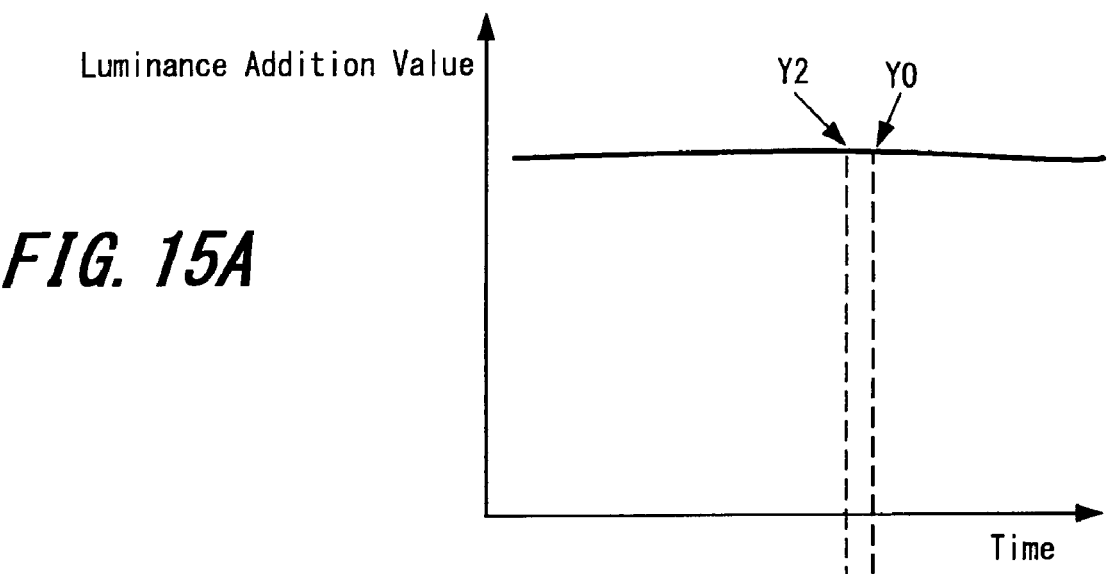
FIGS. 15A, 15B are graphs illustrating processes in determining whether a subject image is in-focus or out-of-focus when using luminance addition values and evaluation values according to an embodiment of the present invention.
Figure 15B:
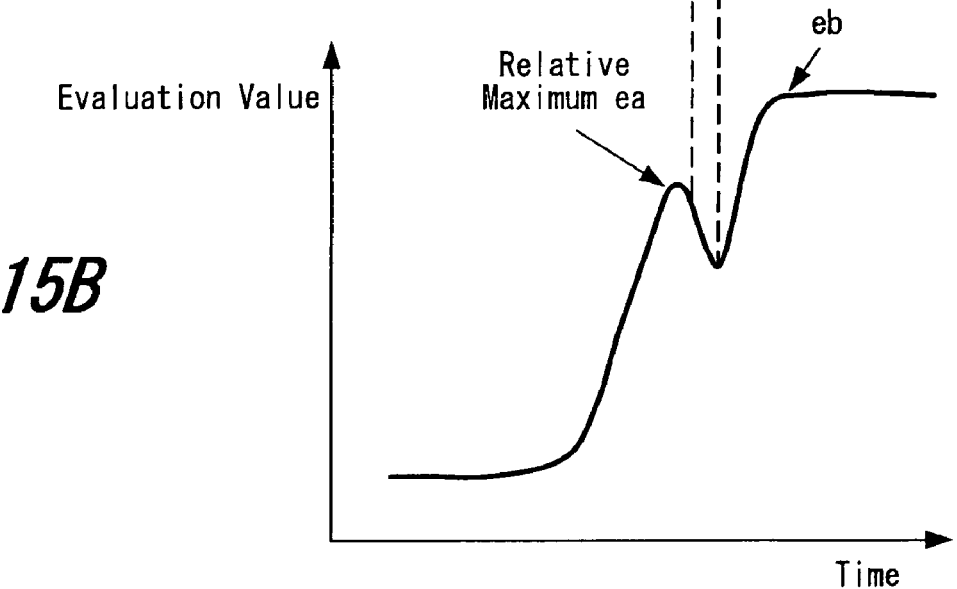

According to condition B, as shown in FIGS. 15A, 15B, when the luminance addition value obtained in the current field are determined as Y0 and the luminance addition value obtained two fields before the current field is determined as Y2, the value obtained by dividing the luminance addition value obtained in the current field by the luminance addition value obtained two fields before the current field is within the prescribed range. The condition B is represented by the following equations 1 and 2.

$$\gamma 1 < Y2/Y0 < \gamma 2 \qquad 2$$

where γ1 and γ1 represent a constant.

The condition B includes a condition (equation 2) to determine whether or not the values indicating the luminance change are within a prescribed range. If the condition B is not satisfied (e.g., see FIG. 12A), the auto-focus unit determines that the subject or the video camera has wobbled while focusing on the subject. Thus, obtaining the more accurate result of focus adjustment and improved reliability is secured by determining whether a subject image is in-focus or out-of-focus while eliminating wobbling of the subject or the video camera. In this embodiment, the luminance addition values used in the equation 2 are defined as the luminance values obtained two fields before the current field. However, the luminance addition values used in the equation 2 are not limited thereto; and any luminance addition values obtained prescribed fields before the current field may appropriately be used. The aforementioned values γ1 and γ2 are appropriately determined based on results obtained from experiments or tests conducted.

According to an embodiment of the present invention, the control unit 9 determines whether or not the auto-focus apparatus exhibits abnormal operation, based on ratios calculated according to respective items (two or more) of the plurality of the results stored in the memory 10. For example, the control unit 9 stores the respective results of the determination in the memory 10, based on the evaluation values and luminance addition values, and retrieves the results when the number of times that the respective values are stored reaches a prescribed number (e.g., 1000 times). Further, the control unit 9 computes a ratio by dividing the number of times that a subject image being in-focus is determined as unreliable by the number of times that a subject image being in-focus is determined as reliable, and determines whether or not circuits located in the auto-focus apparatus and the related units include abnormal portions, based on the value of resulting ratios. According to this method, whether or not the ratio is a prescribed value or more may be determined, and the histories of a plurality of ratios obtained by previously determined results may also be examined.

For example, if the ratio represents the following change as to 0.01 (first time), 0.02 (second time), 0.011 (third time), and 0.04 (current) in examining the histories of the plurality of ratios obtained by previously determined results, the control unit 9 determines that abnormal processing has occurred in the apparatus (circuits located in the auto-focus apparatus, focus drive mechanism and image signal processor, etc.) due to the drastic increase in the current resulting ratios, and warns a user that some abnormal operation has occurred in the apparatus.

A plurality of methods for providing information to a user or notifying a user may be prepared by changing a combination of the conditions (equation 1 and equation 2) and a display method (see below).

Condition for Focal Determination
    equation 1
    equation 1 and equation 2
Method of Providing Information
    Indicator
    icons on the viewfinder or monitor screen
    Signal output (signals are transmitted from the video camera to external equipment by allocating a specific signal line)

Next, auto-focus processing using the video camera according to the present embodiment will be described by referring to the flowchart shown in FIG. 13. In the auto-focus processing according to the present embodiment, the control unit 9 searches the peak of the evaluation values. If the relative maximum is detected, the evaluation value is computed when the focus lens returns to the focus position corresponding to the point at which the peak of the evaluation value has been detected. The control unit 9 analyzes the history of the evaluation values. That is, the control unit 9 analyzes a relation between evaluation values at the relative maximum and evaluation values when the focus lens returns to the focus position corresponding to the point at which the peak of the evaluation value has been detected, assesses reliability of the subject image being in-focus, and provides the outcome of reliability determination to a user.

Figure 2A:
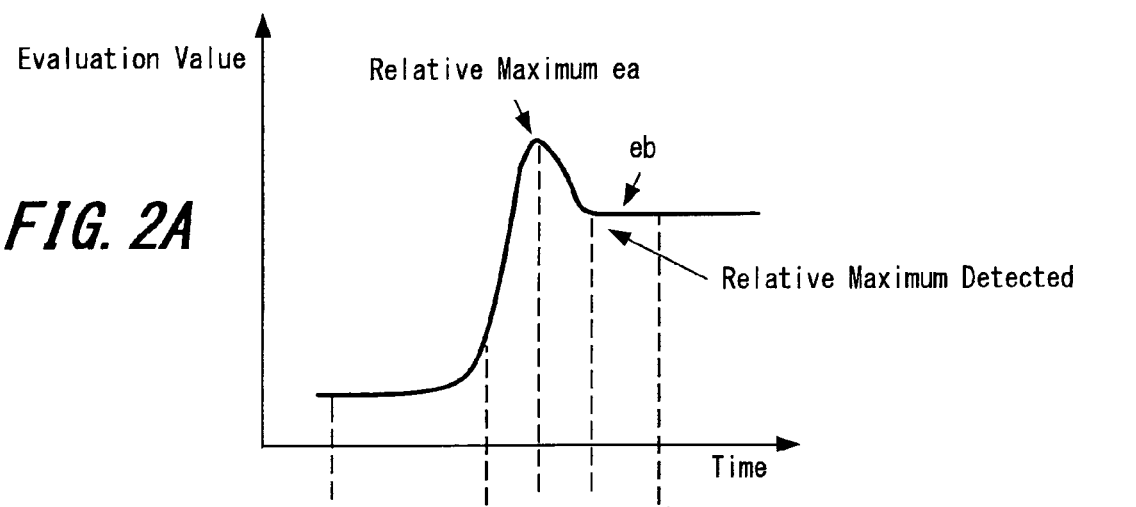
FIGS. 2A, 2B are first graphs respectively illustrating fluctuations of evaluation values and movement of the focus lens when auto-focus processing fails to terminate according to an embodiment of the present invention.
Figure 2B:
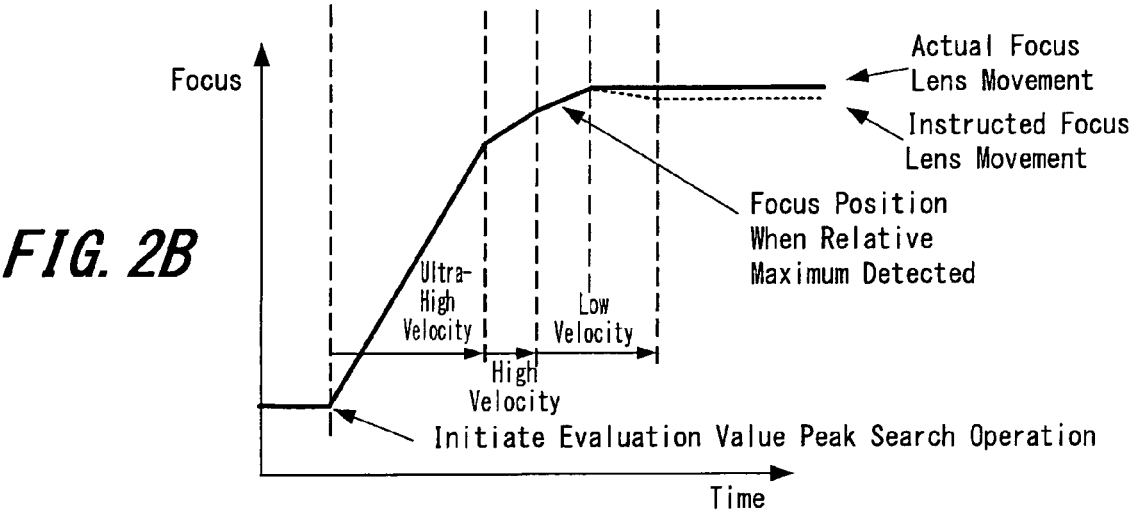
Figure 3A:
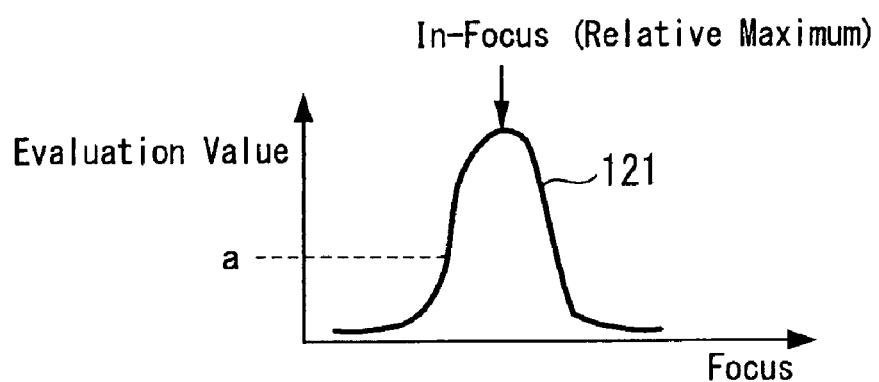
FIGS. 3A, 3B are graphs illustrating fluctuations of evaluation values due to presence or absence of a decrease in SNR.
Figure 3B:
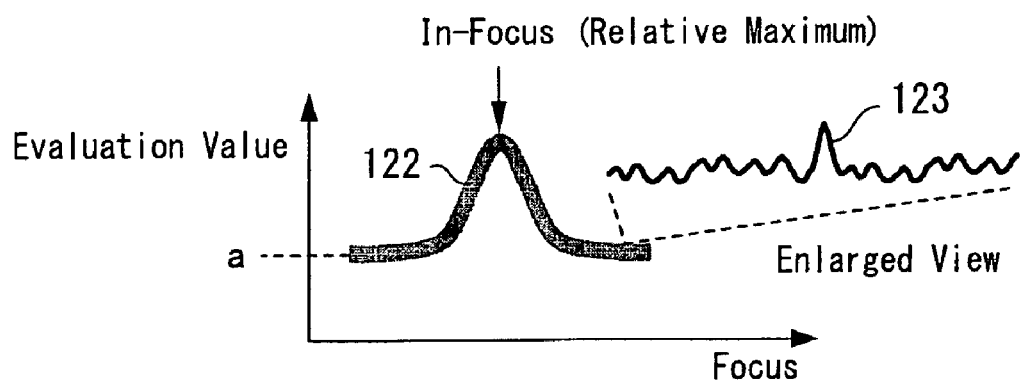

In FIG. 13, the control unit 9 (see FIG. 2) of the video camera initiates one cycle of the auto-focus operation using some kind of triggers, such as prescribed timing or operation signals generated by a switch 13, and then searches the peak of the evaluation values output from the evaluation value calculator 7 (Step S1).

Figure 17:
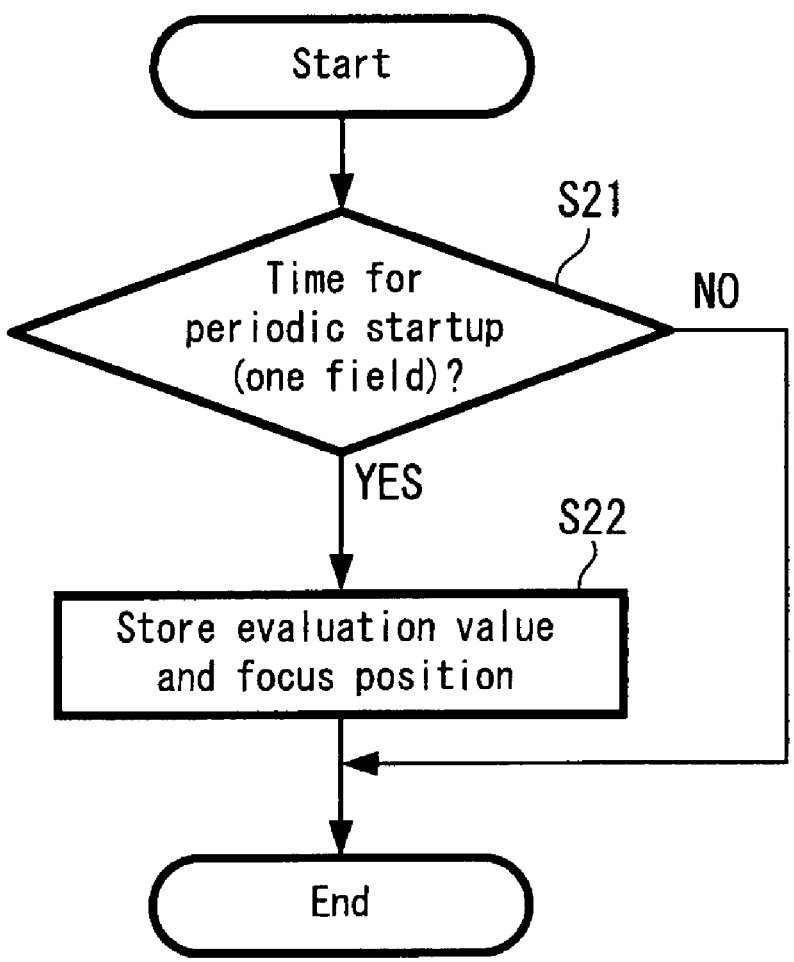
FIG. 17 is a flowchart illustrating background processing according to an embodiment of the present invention.

The control unit 9 periodically stores evaluation values and focus positions in memory 10 as a background processing; that is, the control unit 9 stores the evaluation values and the focus positions in the background, and operates to search the peak of evaluation values based on the stored information. As shown in the flowchart of FIG. 17, the control unit 9 determines whether or not the current time matches a periodic startup time, based on a synchronization signal contained in the image signals, or on clock signals input from a clock signal generator (not shown) (step S21). One example of the periodic startup time is defined as one field according to the present embodiments. If the control unit 9 determines that the current time matches one of the startup time, the control unit 9 initiates AF1 cycle operation, and stores the evaluation values calculated by the evaluation value calculator 7 and the focus positions transmitted from the position detector 1a in the memory 10 (step S22). When the control unit 9 determines that the current time does not match one of the periodic startup time, the control unit 9 terminates the determination processing at step S22.

After initiating the AF1 cycle operation, the control unit 9 retrieves evaluation values and focus positions stored in the memory 10, and sets directions of movements of the focus lens 1 based on the retrieved evaluation value and focus positions.

Figure 16:
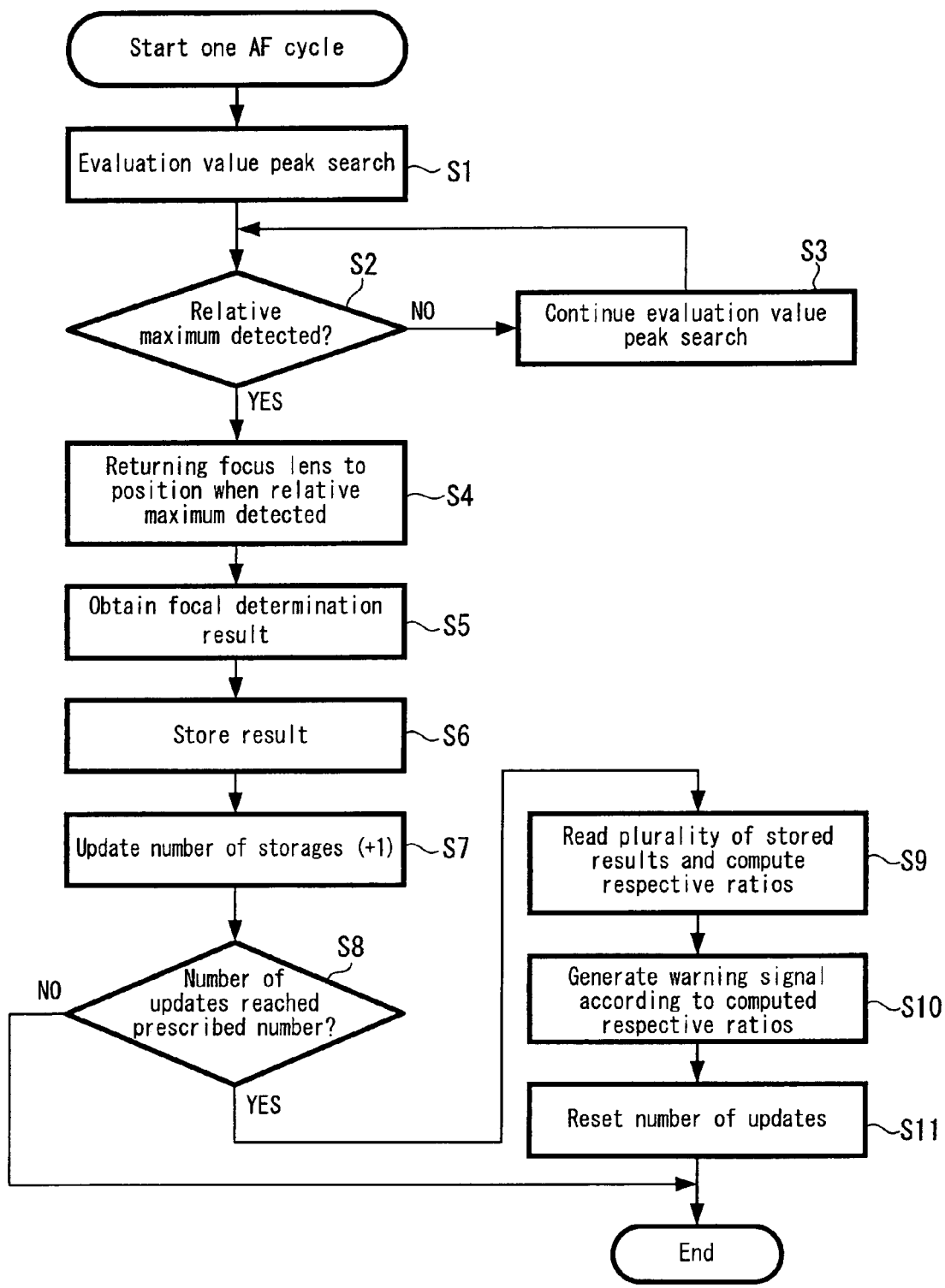
FIG. 16 is a flowchart illustrating an auto-focus processing according to an embodiment of the present invention.

The control unit 9 then determines whether or not the relative maximum has been detected (step S2) as shown in the flowchart of FIG. 16. When the control unit 9 has yet to detect the relative maximum, the control unit 9 continues to search the peak of the evaluation values until the maximum value is detected (step S3).

In the determination processing at step S2, when the relative maximum is detected, the control unit 9 controls the lens driver 2 to return the focus lens to the position corresponding to the point at which the relative maximum has been detected (step S4).

The control unit 9 analyzes the history of the evaluation values. That is, the control unit 9 analyzes a relation between evaluation values at the relative maximum and evaluation values at the current position of the focus lens, and determines whether a subject image is in-focus or out-of-focus using the aforementioned conditions A and B (step S5).

The control unit 9 provides information based on the outcome as to determining whether a subject image is in-focus or out-of-focus at the aforementioned step S5 (step S6).

Subsequently, the control unit 9 updates a number of times (+1) that the results are stored in the memory 10 (step S7). The number of updates is stored in the memory 10 or RAM in the control unit 9. Since the number of times the focal determination (as to whether a subject image is in-focus or out-of-focus) processing conducted is stored, the number of times the subject image being out-of-focus may be computed by subtracting the number of times the subject image being in-focus from the number of times the focal determination processing conducted.

Subsequently, the control unit 9 determines whether or not the number of updates reached a prescribed number (e.g., 1000 times) (step S8). If the number of updates has not reached the prescribed number, the processing at step S8 will terminate.

In the determination processing at step S8, when the number of updates has reached the prescribed number, the control unit 9 retrieves a plurality of determination results from the memory 10, and computes the ratios (proportion) of the retrieved results (step S9). The ratios (proportion) of the determination results are computed in a manner described above. Subsequently, the control unit 9 determines whether or not the auto-focus apparatus includes abnormal portions based on the ratios (proportion). The presence or absence of abnormal portions included in the auto-focus apparatus may be determined by examining as to whether or not the ratios obtained exceed a prescribed value, or by examining the histories of a plurality of ratios obtained by previously determined results.

Furthermore, the control unit 9 generates warning signals (determination signals) based on the computed ratios or proportion, which are then transmitted to external equipment via respective display units such as an indicator or monitor, or IF unit 12 (step 9).

Finally, the control portion 9 resets (initializes) the update number, and terminates processing (step S11).

When some abnormality is detected in the auto-focus operation, such as deterioration in performance of auto-focus operation or deterioration in image quality, the result of the focal determination may fluctuate. In the aforementioned method, whether or not the auto-focus apparatus exhibits abnormal operation may be determined using the fluctuating factors. Since the auto-focus apparatus analyzes a relation between evaluation values obtained at the relative maximum and evaluation values obtained when the focus lens is returned to the focus position corresponding to the point at which the peak of the evaluation values have been detected, and assesses reliability of the subject image being in-focus, the reliability can be assessed with fluctuation of the evaluation values caused by movement of the subject, thereby improving an accuracy in determining whether or not the auto-focus apparatus exhibits abnormal auto-focus operation.

A method of providing information to a user may be as follows. As can be seen from FIG. 5, when the control unit 9 determines that there is "No abnormality detected" in the auto-focus apparatus, a green indicator 11G will light up. Or, when the control unit 9 determines that there are "Abnormality detected" in the auto-focus apparatus, a red indicator 11R will light up. Alternatively, a user may also be informed or notified by displaying prescribed icons 16 on the screen of monitor 15 or the like, through outputting a result of determining whether the subject image is in-focus or out-of-focus (focal determination signals) from the control unit 9 to the monitor driver 14, in addition to lighting indicators 11G and 11R. Further, the focal determination signals or warning signals may be output from the control unit 9 to the external equipment through IF unit 12 that is used as a signal output unit, and a user may be informed by some other display methods using external equipment. [0099]

Moreover, the warning signals may be configured to keep outputting from the control unit 9 to respective units, or may be configured to keep warning for a prescribed period without the user's interference until the user cancels the warning using the user interface (or, operating device). Moreover, the warning may either be effective or ineffective by switching according to the user's setting.

In FIG. 16, the control unit 9 examines whether or not the condition to determine the presence or absence of abnormal operation in the auto-focus operation is satisfied; that is, the control unit 9 examines whether the number of updates has reached a prescribed number. If the condition is satisfied, the control unit 9 initiates the focal determination processing; however, the processing after step S8 may not have to synchronize with the startup of the auto focus operation. Thus, the processing after step S8 may be performed at different time points from that of the startup of the auto focus operation.

Moreover, as a method of providing information, it is possible to provide a plurality of results of determining whether the subject image is in-focus or out-of-focus using a condition C of relatively less rigorous equation 3, which includes a plurality of thresholds on ratios of the evaluation values, in addition to the equation 1. Accordingly, it is possible to assesses more specific reliability of the subject image being in-focus, and to provide detailed information on the focal determination to a user.

Condition C

In the condition C, if the relative maximum of the evaluation values is defined as ea, and the evaluation value obtained when the focus lens returns to and stops at the position corresponding to the point at which the relative maximum has been detected is defined as eb, the condition is represented by the following equations 1 and 3.

$$\alpha < eb/ea \qquad 1$$

$$\beta < eb/ea \qquad 3$$

where $\alpha$ and $\beta$ represent a constant ($\alpha > \beta$).

Thus, if equations 1 and 2 are both used for determination, the number of results obtained is not two but three. The examples of the three results include:

"highly reliable to obtain an accurate in-focus status",
"fairly reliable to obtain an accurate in-focus status", and
"unreliable to obtain an accurate in-focus status".

According to the condition C, whether or not the auto-focus apparatus includes abnormal portion may be determined based on the three results after the prescribed number of updates stored in the storage. The control unit 9 computes the three ratios, based on which a user is informed of the determination results using the aforementioned method of providing information, such as outputting to an indicator, monitor or external equipment.

Below is a specific description of a method of determining whether or not the auto-focus apparatus include abnormal portion based on the three focal determination results. The determination results may, for example, be classified into three as follows.

Details of Focal Determination Results Stored in Storage
Equation 1 is satisfied:

"highly reliable to obtain an accurate in-focus status"     A

Equation 2 only is satisfied:

"fairly reliable to obtain an accurate in-focus status"     B

Equation 3 is not satisfied:

"unreliable to obtain an accurate in-focus status"     C

The method of determining whether or not the auto-focus apparatus include abnormal portion based on the three focal determinations will be described by referring to FIG. 16.

When the auto-focus operation terminates; that is, when returning the focus lens to the position corresponding to the point at which the relative maximum has been detected after having detected the relative maximum of the evaluation values (step S4), the above determination results A, B, and C are obtained (step S5), which are stored in the memory 10, and then the number of updates stored in the memory 10 is further updated (step S7).

When the number of updates has reached the prescribed number, for example, 1000 times (at step S8), the control unit 9 retrieves a plurality of determination results and examines the number of A, B, and C respectively, and computes the respective ratios (proportion) of the retrieved results to the total number (1000 times) (step S9). The respective ratios are used for determination as follows.

<1> If the ratio B is the prescribed value or more (or ratio C is the prescribed value or less), the focus lens is slightly shifted away from the position at which the subject image is in-focus frequently, and hence there may be defects in focus driving or focus detecting systems.

<2> If the ratio C is the prescribed value or more, a subject image is incorrectly determined to be in-focus where the subject image, in fact, is out-of-focus or blurred, and hence the noise of image signals may have increased.

The user may be provided with more specific information about abnormal operation of the auto focus operation by changing presentation of warning (changing display or expression, etc.) according to the aforementioned ratios. For example, when there are defects in focus driving or focus detecting systems as shown in <1>, an icon used may be designed for indicating a defect of lens; whereas when there is an increase in the noise of image signals as shown in <2>, an icon used may be designed for indicating deterioration of video camera.

According to the configuration of the embodiment, the control unit 9 searches the peak of the evaluation values in auto-focus processing. If the relative maximum of the evaluation values is detected, the control unit 9 computes a value obtained when the focus lens returns to the focus position corresponding to the point at which the peak of the evaluation values has been detected The control unit 9 then analyzes the history of the evaluation values. That is, the control unit 9 analyzes a relation between evaluation values at the relative maximum and evaluation values when the focus lens returns to the focus position corresponding to the point at which the peak of the evaluation values has been detected, assesses reliability of the subject image being in-focus, and stores the result of reliability in the memory. According to the embodiment of the present invention, a focal determination as to whether a subject image is in-focus or out-of-focus using evaluation values (evaluation values and luminance addition values) is used as an abnormality detecting method, with which a user can constantly detect a state of auto-focus operation. As a result, whether or not an auto-focus apparatus includes abnormal operation may be determined by applying the configuration of the auto-focus apparatus of the related art to the embodiments of the present invention.

Moreover, since a user is informed (warned) of the outcome of whether an auto-focus apparatus includes abnormal portions, the user is able to obtain the current auto-focus operation state, such as deterioration in performance of auto-focus operation or deterioration in image quality. Accordingly, the aforementioned failure or defects may be suppressed while the user is actually imaging a subject in progress. Moreover, since a user is informed (warned) of deterioration in performance of auto-focus operation, the user may prepare some kind of repairing in order to amend the failure of the video camera.

Next, a second embodiment of the present invention is described below. According to the present embodiment, the video camera shown in FIG. 5 uses an angular velocity sensor or acceleration sensor as a wobbling detector instead of using luminance addition values to detect wobbling of a video camera. Below is a description of a case using an angular velocity sensor to detect wobbling of a video camera.

The control unit 9 operates to search the peak of the evaluation values and detects the local maximum of evaluation values at step S4 in FIG. 16, the control unit 9 computes and analyzes the evaluation value obtained when the focus lens returns to the focus position corresponding to the point at which the peak of the evaluation value has been detected.

Further, the control unit 9 assesses as to whether the angular velocity signals detected by the angular velocity sensor are within a prescribed range of magnitudes at a point where the relative maximum of the evaluation values has been detected, in this embodiment. If the angular velocity signals are outside the prescribed range of magnitudes; that is, the range of the angular velocity signals do not satisfy the condition, the control unit 9 determines that the video camera has wobbled, and hence obtaining in-focus status of the subject image is unreliable regardless of the outcome determined by using the evaluation values. Below are equations used for determining whether a subject image is in-focus or out-of-focus using angular velocity signals.

$$Vpan < Vmin \text{ or } Vmax < Vpan \text{ Or}$$

$$Vtilt < Vmin \text{ or } Vmax < Vtilt \quad 4$$

where Vpan and Vtilt represent angular velocity signals in the pan and tilt directions respectively, and Vmax and Vmin (Vmax>Vmin) are constants.

If the detected angular velocity signals do not satisfy the equation 4, the control unit 9 determines that the video camera has wobbled, and hence obtaining an in-focus status of the subject image is unreliable regardless of the outcome determined by using the evaluation values. Thus, obtaining the more accurate result of focus adjustment and improved reliability is secured by determining whether a subject image is in-focus or out-of-focus while eliminating wobbling of the subject or the video camera. This embodiment may provide a similar effect obtained in the first embodiment.

It should be noted that the present invention is not limited to the above-described embodiments; for example, an image capture apparatus according to the embodiments of the present invention can be applied to a digital camera in place of the above-described video camera, and various other changes and modifications can of course be made without deviating from the gist of the invention.

Further, the auto-focus operation using operation signals of one-shot switch 13 as a trigger is described above; however, the present invention can be applied to full automatic focus operation that constantly performs automatic focusing regardless of the instructions directed by the switch 13. It should be understood by those skilled in the art that various modifications, combinations, sub-combinations and alterations may occur depending on design requirements and other factors insofar as they are within the scope of the appended claims or the equivalents thereof.

What is claimed is:

1. An auto-focus apparatus comprising:
   an evaluation value calculator configured to periodically calculate evaluation values using high frequency components of image signals in a specific region of a subject image captured by an image capture unit;
   a control unit configured to output instruction values provided to a lens driver for driving a focus lens based on the evaluation values, to conduct operation to search the peak of the evaluation values while moving positions of the focus lens, to return the focus lens to the position corresponding to a point at which the relative maximum has been detected after having detected the relative maximum of the evaluation values, to obtain the evaluation values calculated by the evaluation value calculator, and to determine whether or not the evaluation value satisfies a prescribed condition; and
   a storage configured to store a plurality of determination results determined by the control unit, wherein
   the control unit determines whether or not the auto-focus apparatus includes abnormal portions based on the plurality of the determination results stored in the storage.

2. An auto-focus apparatus according to claim 1, wherein the prescribed condition involves that when a first evaluation value is defined as the relative maximum of the evaluation values and a second evaluation value is defined as the evaluation value obtained when the focus lens returns to the position corresponding to a point at which the relative maximum has been detected, a value obtained from dividing the second evaluation value by the first evaluation value is larger than a prescribed threshold.

3. An auto-focus apparatus according to claim 1, wherein the control unit determines whether or not the auto-focus apparatus includes abnormal portions, based on ratios calculated according to respective items of the number of the determination results stored in the storage.

4. An auto-focus apparatus according to claim 1, wherein the control unit determines whether or not the auto-focus apparatus includes abnormal portions, based on ratios calculated according to respective items of the number of the determination results stored in the storage, and displays the determination results on a display unit when the number of times that the determination results are stored reaches a prescribed number.

5. An auto-focus apparatus according to claim 1, further comprising:
   a signal output unit configured to output signals according to a number of determination results stored in the storage based on which the control unit determines whether or not the auto-focus apparatus includes abnormal portions when the number of times that the determination results are stored reaches a prescribed number.

6. An auto-focus apparatus comprising:
   an evaluation value calculator configured to periodically calculate evaluation values using high frequency components of image signals in a specific region of a subject image captured by an image capture unit;
   a luminance addition value calculator configured to calculate luminance addition values by integrating luminance of the image signals in the specific region;
   a control unit configured to output instruction values provided to a lens driver for driving a focus lens based on the evaluation values, to conduct operation to search the peak of the evaluation values while moving positions of the focus lens, to return the focus lens to the position corresponding to a point at which the relative maximum has been detected after having detected the relative maximum of the evaluation values, to obtain the evaluation values calculated by the evaluation value calculator and the luminance addition values calculated by the luminance value calculator, and to determine whether or not the evaluation value satisfies a prescribed condition; and a storage configured to store the plurality of determination results determined by the control unit, wherein the control unit determines whether or not the auto-focus apparatus includes abnormal portion based on the plurality of the determination results stored in the storage.

7. An auto-focus apparatus according to claim 6, wherein if a first condition involves that when a first evaluation value is defined as the relative maximum of the evaluation values and a second evaluation value is defined as the evaluation value obtained when the focus lens returns to the position corresponding to a point at which the relative maximum has been detected, a value obtained from dividing the second evaluation value by the first evaluation value is larger than a prescribed threshold in the determination results; and if a second condition involves that when a first luminance addition value is defined as the luminance addition value obtained when the relative maximum has been detected, and a second luminance addition value is defined as the luminance addition value obtained a prescribed fields before the relative maximum has been detected, a value obtained from dividing the second luminance addition value by the first luminance value falls within a prescribed threshold, the control unit stores results of determination as to whether or not the first condition is satisfied in the storage, provided that the second condition is satisfied.

8. An auto-focus apparatus according to claim 6, wherein the control unit determines whether or not the auto-focus apparatus includes abnormal portion, based on ratios calculated according to respective items of the plurality of the determination results stored in the storage.

9. An auto-focus apparatus according to claim 6, wherein the control unit determines whether or not the auto-focus apparatus includes abnormal portions, based on ratios calculated according to respective items of the number of the determination results stored in the storage, and displays the determination results on a display unit when the number of times that the determination results are stored reaches a prescribed number.

10. An auto-focus apparatus according to claim 6, wherein a signal output unit configured to output signals according to a number of determination results stored in the storage based on which the control unit determines whether or not the auto-focus apparatus includes abnormal portions when the number of times that the determination results are stored reaches a prescribed number.

11. An image capture apparatus, comprising:

an auto-focus apparatus including an image capture unit configured to image a subject, an evaluation value calculator configured to periodically calculate evaluation values using high frequency components of image signals in a specific region of a subject image captured by the image capture unit, a control unit configured to output instruction values provided to a lens driver for driving a focus lens based on the evaluation values, to conduct operation to search the peak of the evaluation values while moving positions of the focus lens, to return the focus lens to the position corresponding to a point at which the relative maximum has been detected after having detected the relative maximum of the evaluation values, to obtain the evaluation values calculated by the evaluation value calculator, and to determine whether or not the evaluation value satisfies a prescribed condition; and a storage configured to store a plurality of determination results determined by the control unit, wherein the control unit determines whether or not the auto-focus apparatus includes abnormal portion based on the plurality of the determination results stored in the storage.

12. An image capture apparatus, comprising:

an auto-focus apparatus including an image capture unit configured to image a subject, an evaluation value calculator configured to periodically calculate evaluation values using high frequency components of image signals in a specific region of a subject image captured by the image capture unit, a luminance addition value calculator configured to calculate luminance addition values by integrating luminance of the image signals in the specific region, and a control unit configured to output instruction values provided to a lens driver for driving a focus lens based on the evaluation values, to conduct operation to search the peak of the evaluation values while moving positions of the focus lens, to return the focus lens to the position corresponding to a point at which the relative maximum has been detected after having detected the relative maximum of the evaluation values, to obtain the evaluation values calculated by the evaluation value calculator and the luminance addition values calculated by the luminance value calculator, and to determine whether or not the evaluation value satisfies a prescribed condition; and a storage configured to store a plurality of determination results determined by the control unit, wherein the control unit determines whether or not the auto-focus apparatus includes abnormal portion based on the plurality of the first determination results stored in the storage.

13. An auto-focus method conducted using evaluation values obtained from image signals of a subject image captured by an auto-focus apparatus, comprising the steps of:

periodically calculating evaluation values using high frequency components of image signals in a specific region of a subject image captured by an image capture unit, searching the peak of the evaluation values while moving positions of a focus lens, calculating the evaluation values by returning the focus lens to the position corresponding to a point at which the relative maximum has been detected after having detected the relative maximum of the evaluation values, conducting a determination as to whether or not the evaluation values satisfy a first condition, and determining whether or not the auto-focus apparatus includes abnormal portion based on the plurality of the determination results stored in the storage.

14. An auto-focus method conducted using evaluation values obtained from image signals of a subject image captured by an auto-focus apparatus, comprising the steps of:

periodically calculating evaluation values using high frequency components of image signals in a specific region of a subject image captured by an image capture unit;

calculating luminance addition values by integrating luminance of the image signals in a specific region, and searching the peak of the evaluation values while moving positions of a focus lens, calculating the evaluation values by returning the focus lens to the position corresponding to a point at which the relative maximum has been detected after having detected the relative maximum of the evaluation values, conducting a determination as to whether or not the evaluation values and the luminance addition values satisfy a prescribed condition, and determining whether or not the auto-focus apparatus includes abnormal portion based on a plurality of the determination results stored in the storage.

* * * * *